United States Patent
Kanno et al.

(10) Patent No.: US 9,604,365 B2
(45) Date of Patent: Mar. 28, 2017

(54) DEVICE AND METHOD OF TRANSFERRING ARTICLES BY USING ROBOT

(71) Applicant: FANUC CORPORATION, Minamitsuru-gun, Yamanashi (JP)

(72) Inventors: Ichiro Kanno, Yamanashi (JP); Kentarou Koga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 113 days.

(21) Appl. No.: 14/955,608

(22) Filed: Dec. 1, 2015

(65) Prior Publication Data
US 2016/0151916 A1 Jun. 2, 2016

(30) Foreign Application Priority Data
Dec. 2, 2014 (JP) ................................. 2014-244004

(51) Int. Cl.
*B25J 9/16* (2006.01)
*B65G 47/90* (2006.01)

(52) U.S. Cl.
CPC ........... *B25J 9/1697* (2013.01); *B25J 9/1664* (2013.01); *B65G 47/90* (2013.01); *G05B 2219/37555* (2013.01); *G05B 2219/37563* (2013.01); *G05B 2219/39102* (2013.01)

(58) Field of Classification Search
CPC ..................... B25J 9/1697; G05B 2219/37555
See application file for complete search history.

(56) References Cited

U.S. PATENT DOCUMENTS

| | | | | |
|---|---|---|---|---|
| 5,727,132 A * | 3/1998 | Arimatsu | ........... | G05B 19/4083 700/259 |
| 6,646,404 B2 * | 11/2003 | Okuyama | .............. | B25J 9/1669 318/568.13 |
| 6,898,486 B2 * | 5/2005 | Watanabe | ............. | G06T 7/0044 29/714 |
| 7,177,459 B1 * | 2/2007 | Watanabe | ............. | B25J 9/1697 382/151 |
| 7,386,367 B2 * | 6/2008 | Watanabe | ............. | B25J 9/1697 700/245 |

FOREIGN PATENT DOCUMENTS

JP    H 08-063214 A    3/1996

* cited by examiner

*Primary Examiner* — Thomas Randazzo
(74) *Attorney, Agent, or Firm* — RatnerPrestia

(57) ABSTRACT

An article transferring device with a robot. An image processing section includes an article detecting section for executing image capturing and detection of articles that move according to a conveying motion of a conveyor, with a first period allowing all of the articles to be captured and detected, and obtain initial position information of each of all articles; and an article tracking section for executing image capturing and detection of the articles that move according to the conveying motion of the conveyor, with a second period shorter than the first period, and obtain shifted position information of each article iteratively with the second period, the shifted position information being based on the initial position information. A robot controlling section is configured to control the robot by using the shifted position information, so as to make the robot hold and transfer each article while following the conveying motion of the conveyor.

12 Claims, 22 Drawing Sheets

|    | X  | Y  | Φ   |
|----|----|----|-----|
| P1 | X1 | Y1 | 0   |
| P2 | X1 | Y2 | -90 |
| P3 | X2 | Y1 | 90  |
| P4 | X2 | Y2 | 180 |

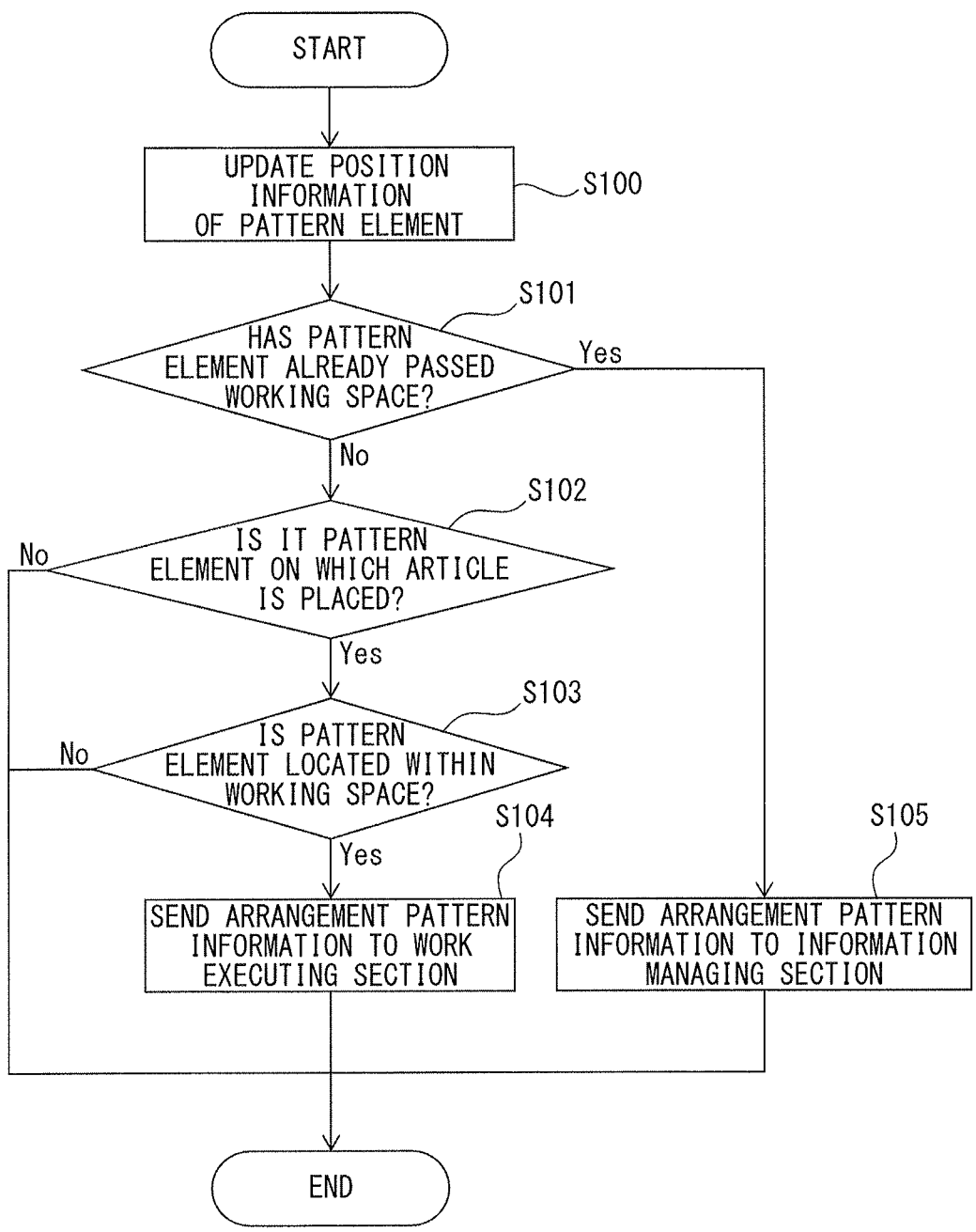

DEVICE AND METHOD OF TRANSFERRING ARTICLES BY USING ROBOT

BACKGROUND OF THE INVENTION

1. Field of the Invention

The present invention relates to an article transferring device and an article transferring method for transferring articles by using a robot.

2. Description of the Related Art

It is known to provide a system in which a vision sensor detects a plurality of articles being conveyed on a conveyor and, based on position information of each detected article, a robot holds the article while following the conveying motion of the conveyor and transfers the article to another place.

Japanese Unexamined Patent Publication No. H08-063214 (JPH08-063214A), for example, discloses a visual tracking method in which a vision sensor detects workpiece being conveyed on a conveyor and, based on the position of the detected workpiece, a robot holds the workpiece while following the conveyor. In this visual tracking method, the conveyor is equipped with a pulse coder in order to detect the amount by which the workpiece has been conveyed. Upon recognizing from the output signal of the pulse coder that the workpiece has been conveyed a predetermined distance, the visual sensor obtains an image of the workpiece being conveyed. Upon recognizing from the output signal of the pulse coder that the workpiece has been conveyed the predetermined distance, the tracking motion of the robot is started under the control of a robot controller. During the tracking motion, the robot controller controls the robot in a tracking coordinate system moving with the workpiece and causes the robot to hold the workpiece being conveyed on the conveyor by considering the position of the workpiece obtained from the image obtained by the vision sensor.

SUMMARY OF THE INVENTION

In a system in which a robot transfers an article by holding the article while following the conveying motion of a conveyor based on the position information of the article detected by a vision sensor, it is desired that the robot be configured to be able to hold the article while following the conveyor by accurately identifying the current position of the article without having to equip the conveyor with a sensor such as an encoder for detecting the amount of movement. In such a system, it is also desired that the robot be configured to be able to hold the article while tracking its position, even when the article is displaced in position on the conveyor after detection by the vision sensor, or even when the article has failed to be detected by the vision sensor because, for example, the article is hidden behind another article.

One aspect of the present invention provides an article transferring device, comprising a conveyor configured to convey an article; a robot configured to hold and transfer the article; an image capturing section configured to capture an image of the article; an image processing section configured to control the image capturing section and detect the article based on image data captured by the image capturing section; and a robot controlling section configured to control the robot with use of information of the article detected by the image processing section; wherein the image processing section comprises: an article detecting section configured to execute image capturing and detection of a plurality of articles that move according to a conveying motion of the conveyor, with a first period allowing all of the plurality of articles to be captured and detected, and obtain initial position information of each of all of the articles; and an article tracking section configured to execute image capturing and detection of the plurality of articles that move according to the conveying motion of the conveyor, with a second period shorter than the first period, and obtain shifted position information of each of the plurality of articles iteratively with the second period, the shifted position information being based on the initial position information; and wherein the robot controlling section is configured to control the robot with use of the shifted position information, so as to make the robot hold and transfer each of the plurality of articles while following the conveying motion of the conveyor.

Another aspect of the present invention provides an article transferring method, configured to make a robot hold and transfer a plurality of articles conveyed by a conveyor, the method comprising executing image capturing and detection of the plurality of articles that move according to a conveying motion of the conveyor, with a first period allowing all of the plurality of articles to be captured and detected, and obtaining initial position information of each of all of the articles; executing image capturing and detection of the plurality of articles that move according to the conveying motion of the conveyor, with a second period shorter than the first period, and obtaining shifted position information of each of the plurality of articles iteratively with the second period, the shifted position information being based on the initial position information; and controlling the robot with use of the shifted position information, so as to make the robot hold and transfer each of the plurality of articles while following the conveying motion of the conveyor.

According to the article transferring device of the one aspect, after the article detecting section in the image processing section has obtained the initial position information of the article conveyed on the conveyor, the article tracking section in the image processing section obtains the shifted position information of the article, and the robot controlling section controls the robot by using the shifted position information; this eliminates the need to equip the conveyor with a sensor such as an encoder for detecting the amount of movement, and the robot can comprehend the current position of the article conveyed by the conveyor and hold the article M while following the conveyor. Accordingly, the system in which the robot holds each article while following the conveying motion of the conveyor and transfers the article to another place can be constructed even in a situation where it is difficult to equip the conveyor with a sensor such as an encoder for detecting the amount of movement. Furthermore, since the article tracking section is configured to obtain the shifted position information of each article iteratively with the second period, if the position of the article is displaced on the conveyor after the article detecting section has obtained the initial position information of the article, the article tracking section can update the shifted position information by tracking the position of the article and, using the updated shifted position information, the robot 14 can comprehend the current position of the article after the positional displacement and hold the article.

According to the article transferring method of the other aspect, the same advantageous effect as that offered by the article transferring device described above can be achieved.

BRIEF DESCRIPTION OF THE DRAWINGS

The objects, features and advantages of the present invention will become more apparent from the following description of the embodiments in connection with the accompanying drawings, wherein:

FIG. 22 is a flowchart illustrating the details of processing performed by the information managing section.

DETAILED DESCRIPTION

Figure 1:
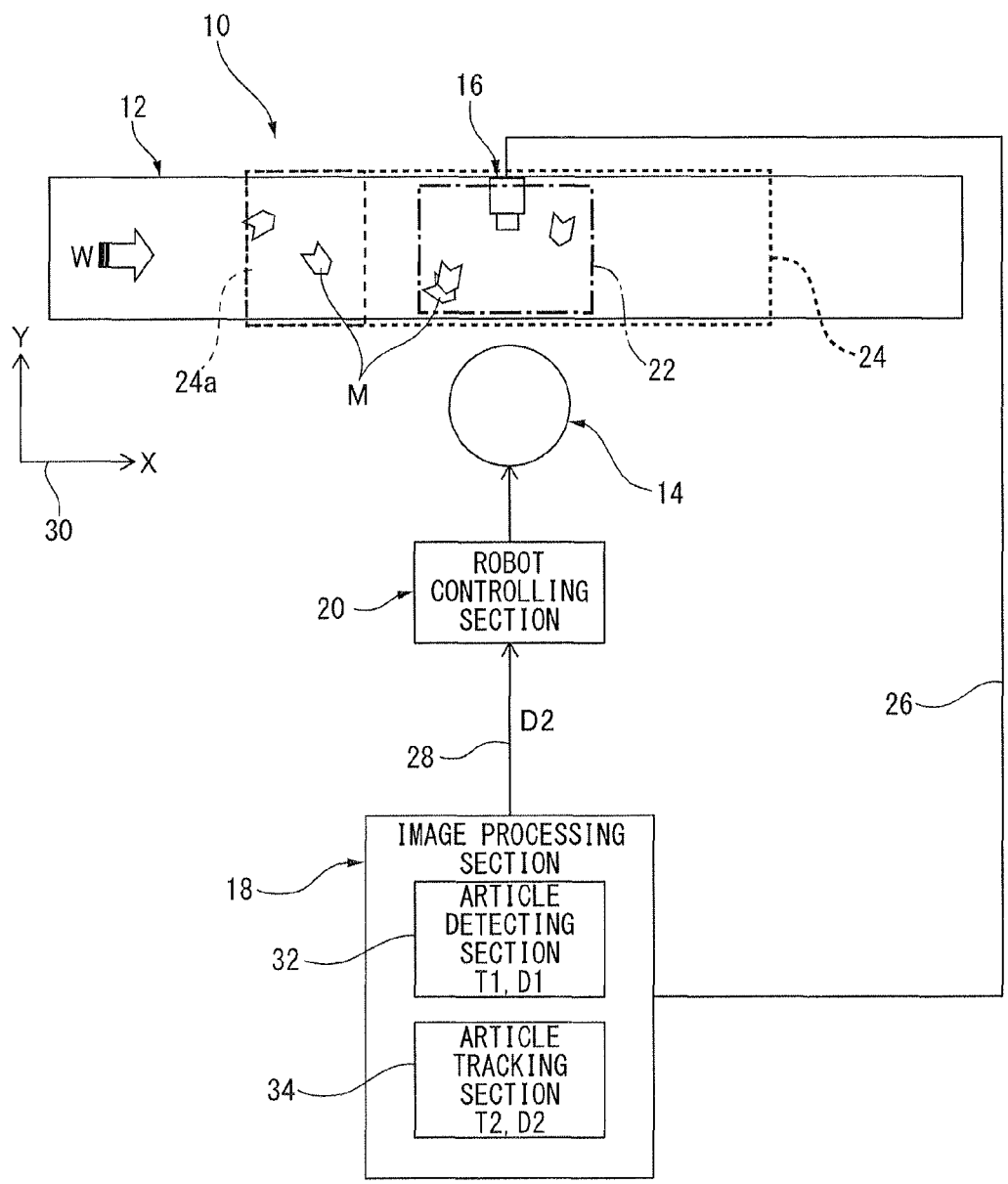
FIG. 1 is a diagram schematically illustrating the configuration of an article transferring device according to one embodiment.

Embodiments of the present invention will be described below with reference to the accompanying drawings. Throughout the drawings, corresponding components are designated by like reference numerals.

FIG. 1 shows an article transferring device 10 according to one embodiment. The article transferring device 10 includes a conveyor 12 configured to convey an article M, a robot 14 configured to hold and transfer the article M, an image capturing section 16 configured to capture an image of the article M, an image processing section 18 configured to control the image capturing section 16 and detect the article M based on the data of the image captured by the image capturing section 16, and a robot controlling section 20 configured to control the robot 14 with use of information of the article M detected by the image processing section 18.

The conveyor 12 includes a known conveying member capable of supporting a plurality of articles M and conveying them in one direction (in the drawing, the direction indicated by arrow W), and a known driving mechanism for driving the conveying member in a continuous or intermissive manner. The plurality of articles M conveyed on the conveyor 12 may have various shapes, dimensions, appearances (colors), etc., or may have the same shape, dimension, appearance (color), etc. Further, the articles M may be such articles as fruits or vegetables whose shapes tend to make the support of the articles M on the conveyor 12 unstable.

The plurality of articles M are conveyed in a random arrangement on the conveyor 12 and enter a predetermined working space (the area where the articles M are held and picked up) 22 (indicated by semi-dashed lines) to be accessed by the robot 14. The term "random arrangement" refers to an arrangement in which the articles M are not intended to be arranged in any orderly form but are arranged in a random manner such that the articles M take various positions and orientations in a two-dimensional space (e.g., in an image captured by the image capturing section 16) when the articles M are viewed from directly above. In the present embodiment, the conveyor 12 is not equipped with a sensor for detecting the amount of movement such as an encoder that can detect the position or speed of the conveying member or the driving mechanism.

The robot 14 may include a mechanical section (not shown) suitably selected from among known mechanical sections (i.e., manipulators) of various types such as an articulated type, gantry type, and parallel link type, and a hand suitably selected from among known hands of various types such as a suction type and gripper type. The robot 14 is disposed in a predetermined position on one side of the conveyor 12, and operates in such a manner that the mechanical section or hand holds and picks up the article M in the working space 22 of the robot 14 while tracking the article M being conveyed on the conveyor 12, and transfers the article M to another place. In the present embodiment, the robot 14 is equipped with one mechanical section.

The image capturing section 16 has a predetermined field of view 24 (indicated by dashed lines) which extends longitudinally in the conveying direction of the conveyor 12 to encompass a portion thereof and laterally across the entire width of the conveyor 12. The working space 22 of the robot 14 is located within the field of view 24. The image capturing section 16 obtains two-dimensional image data by imaging an image of the articles M and the conveyor 12 in the field of view 24 from directly above the conveyor 12. In the present embodiment, the image capturing section 16 includes one camera (hereinafter, sometimes referred to as the camera 16). The camera 16 may be a digital camera, and the resolution and the image capturing range, for example, may be set as desired. In the present embodiment, the camera 16 may be switched between a mode that captures an image of a portion 24a of the field of view 24 at the upstream end as viewed in the conveying direction of the conveyor and a mode that captures an image in the entire field of view 24. The camera 16 is connected to the image processing section 18 via a camera cable 26.

The image processing section 18 applies appropriate image processing to the two-dimensional data that the image capturing section 16 obtained by imaging an image of the articles M and the conveyor 12 in the field of view 24, and thereby detects the presence of each article M and obtains information representing the position (coordinate values) and orientation (rotation angle) of each article M in a predetermined two-dimensional coordinate system. As will be described later, the "position information" (initial position information, shifted position information, etc.) that the image processing section 18 obtains usually includes information representing the position and orientation of the article M, but when the article M is circular in shape, for example, the "position information" may not include information representing the orientation of the article M. In the present specification, information representing the position and orientation of the article M and information representing the position of the article M are both referred to as the "position information". The image processing section 18 may also obtain information concerning the two-dimensional external shape, color, etc. of each article M (hereinafter referred to as the external appearance characteristic information). The position information of the article M obtained by the image processing section 18 may be displayed in the form of an image on a monitor not shown.

The image processing section 18 is connected to the robot controlling section 20 via a communication cable 28 so that the position information of the article M detected from the two-dimensional data obtained by the image capturing section 16 may be transmitted as needed to the robot controlling section 20. Alternatively, the image processing section 18 and the robot controlling section 20 may be incorporated into a single common control device, as will be described later.

A two-dimensional conveyor coordinate system (stationary coordinate system) 30 may be defined for the conveyor 12 by taking its conveying direction as the X axis. In the present embodiment, the robot 14 may be operated in the conveyor coordinate system 30 in accordance with a command defined in the conveyor coordinate system 30. Further, the image processing section 18 may define the position information of the detected article M in the conveyor coordinate system 30 by performing the calibration of the image capturing section 16 in the conveyor coordinate system 30. The robot controlling section 20 controls the robot 14 by using the position information of the article M detected by the image processing section 18, and causes the robot 14 to perform a holding action that matches the type of the hand.

The image processing section 18 includes an article detecting section 32 configured to execute image capturing and detection of a plurality of articles M that move according to a conveying motion of the conveyor 12, with a first period T1 allowing all of the plurality of articles M to be captured and detected, and obtain initial position information D1 of each of all of the articles M, and an article tracking section 34 configured to execute image capturing and detection of the plurality of articles M that move according to the conveying motion of the conveyor 12, with a second period T2 shorter than the first period T1, and obtain shifted position information D2 of each of the plurality of articles M iteratively with the second period T2, the shifted position information D2 being based on the initial position information D1. The robot controlling section 20 is configured to control the robot 14 with use of the shifted position information D2, so as to make the robot 14 hold and transfer each of the plurality of articles M while following the conveying motion of the conveyor 12. In the present embodiment, the initial position information D1 and the shifted position information D2 are each represented by the coordinate values and the rotation angle (or only by the coordinate values) in the conveyor coordinate system 30.

The article detecting section 32 has the function of initially recognizing and detecting (hereinafter sometimes described as "initially detecting") each of the plurality of articles M in the field of view 24 of the image capturing section 16 as the articles M are conveyed on the conveyor 12 toward the working space 22 of the robot 14. In the present embodiment, the article detecting section 32 is configured to initially detect each article M as the article M enters the upstream end portion 24a of the field of view 24 of the image capturing section 16. The first period T1 is the period with which the image capturing section 16 can capture an entire image of each article M at least once in the upstream end portion 24a of the field of view 24.

In a specific example, when the length of the upstream end portion 24a of the field of view 24 as viewed in the conveying direction W of the conveyor 12 (i.e., in the X axis direction in the conveyor coordinate system 30) is 400 mm, the maximum width of the article M is 100 mm, and the conveying speed of the conveyor 12 is 200 mm/s, then the first period T1 required for the image of each particular article M being conveyed on the conveyor 12 to be captured once during the interval from the moment the entirety of the article M enters the upstream end portion 24a to the moment a portion of the article M exits the upstream end portion 24a is given as follows.

$$T1=(400 \text{ (mm)}-100 \text{ (mm)})/200 \text{ (mm/s)}=1.5 \text{ (s)}$$

In the above specific example, by performing image capturing of the plurality of articles M with the first period T1 as the articles M are conveyed on the conveyor 12 toward the working space 22, the image of each article M can be captured and initially detected while the article M is located within the upstream end portion 24a, and thus the initial position information D1 of each of the articles M can be obtained.

The article tracking section 34 has the function of subsequently recognizing and detecting (hereinafter sometimes described as "tracking") each of the plurality of articles M in the field of view 24 of the image capturing section 16 after the articles M are initially detected by the article detecting section 32. In the present embodiment, the article tracking section 34 is configured to track each article M in the entire field of view 24 of the image capturing section 16. The second period T2 is the period with which the image capturing section 16 can capture an entire image of each article M in the field of view 24 iteratively a number of times sufficient to track the article M without mistakenly detecting another article M.

For example, if two articles M placed side by side in exactly the same orientation (rotation angle) are to be detected correctly without mistaking one for the other, it is believed that the image capturing of each article M by the image capturing section 16 and the detection by the article tracking section 34 should be completed within a period that the article M is conveyed on the conveyor 12 by a distance equal to one half of the minimum width of the article M. Under this condition, when the minimum width of the article M is 60 mm in the above specific example, the second period T2 is given as follows.

$$T2=(60 \text{ (mm)}/2)/200 \text{ (mm/s)}=0.15 \text{ (s)}$$

In the above specific example, by performing image capturing of the plurality of articles M with the second period T2 as the articles M are conveyed on the conveyor 12, the image of each article M can be captured iteratively in the field of view 24 and tracked without mistaking it for another article M, and thus the shifted position information D2 of each of the articles M can be obtained. If the second period T2 is set as short as the processing capability of the image processing section 18 can allow by disregarding the condition "one half of the minimum width of the article M", the reliability of the shifted position information D2, and hence the accuracy with which the robot 14 operates to hold the article M while tracking its position, can be maximized.

The image processing section 18 performs the image capturing and detection (i.e., tracking) with the second period T2 by the article tracking section 34 concurrently with the image capturing and detection (i.e., initial detection) with the first period T1 by the article detecting section 32 (i.e., it performs so-called multitasking). At this time, taking as the initial values the position and orientation values (or only the position value) contained in the initial position information D1 of the article M obtained by the article detecting section 32, the article tracking section 34 continually and iteratively obtains the shifted position information D2 representing the constantly changing position and orientation values (or only the position value) (i.e., the amount of change) of the article M by iteratively performing the image capturing and detection of the article M with the second period T2. The camera 16 constituting the image capturing section 16 performs the image capturing with the first period T1 and the image capturing with the second period T2 at appropriate timings and in appropriate order.

In the image processing section 18, the initial position information D1 of each article M obtained by the article detecting section 32 is used for article tracking by the article tracking section 34, and at the same time, the initial position information D1 is assembled into a single packet (hereinafter referred to as a packet α) and sent to the robot controlling section 20 together with other information necessary for causing the robot 14 to hold each article M. The information carried in the packet α includes a packet ID indicating that the information is the packet α, the initial position information D1 obtained by the article detecting section 32, the image capture time of the article corresponding to the initial position information D1, and an article ID as a sequence number indicating the article M. For each of the plurality of articles M being conveyed on the conveyor 12 toward the working space 22 of the robot 14, the packet α is created only once and sent to the robot controlling section 20.

In the image processing section 18, the shifted position information D2 of each article M iteratively obtained by the article tracking section 34 is also assembled into a single packet (hereinafter referred to as a packet β) each time the information is obtained, and sent to the robot controlling section 20 together with other information necessary for causing the robot 14 to hold each article M. The information carried in the packet β includes a packet ID indicating that the information is the packet β, the shifted position information D2 obtained by the article tracking section 34, the image capture time of the article corresponding to the shifted position information D2, and an article ID as a sequence number indicating the article M. For each of the plurality of articles M being conveyed on the conveyor 12 toward the working space 22 of the robot 14, the packet β is created repeatedly and sent to the robot controlling section 20.

Based on the information of the packet α received from the image processing section 18, the robot controlling section 20 creates article information for causing the robot 14 to hold each article M, and assembles the article information into a single packet (hereinafter referred to as a packet γ).

The information carried in the packet γ includes, in addition to the information of the packet α, the shifted position information D2 and the article image capture time that are carried in the information of the packet β received from the image processing section 18 an arbitrary number of times up to that time, including the most recently received one. Further, information concerning the moving speed of the article M (i.e., the conveying speed of the conveyor 12), which is obtained from the time interval over which the shifted position information D2 and the article image capture time have been received the arbitrary number of times, may also be included in the packet γ. The number of times that the packet β is to be received for the creation of the packet γ may be set as desired by the user of the article transferring device 10. As each article M is picked up by the robot 14 and removed from the conveyor 12, the robot controlling section 20 deletes the information of the packet γ concerning that article M.

The robot controlling section 20 compares the information of the packet β constantly transmitted from the image processing section 18 with the currently held information of the packet γ to recognize the presence of the article M going to enter the working space 22 of the robot 14 or currently traversing the working space 22. Then, the robot controlling section 20 controls the robot 14 by using the shifted position information D2 of the article M carried in the packet β corresponding to the article M whose presence has been recognized. Under the control of the robot controlling section 20, the robot 14 holds and picks up the article M while following the conveying motion of the conveyor 12, and transfers the article M from the conveyor 12 to a predetermined different place.

According to the article transferring device 10 having the above configuration, after the article detecting section 32 in the image processing section 18 has obtained the initial position information D1 of the article M conveyed on the conveyor 12, the article tracking section 14 in the image processing section 18 obtains the shifted position information D2 of the article M, and the robot controlling section 20 controls the robot 14 by using the shifted position information D2; this eliminates the need to equip the conveyor 12 with a sensor such as an encoder for detecting the amount of movement, and the robot 14 can comprehend the current position of the article M conveyed by the conveyor 12 and hold the article while following the conveyor 12. Accordingly, the system in which the robot holds each article while following the conveying motion of the conveyor and transfers the article to another place can be constructed even in a situation where it is difficult to equip the conveyor with a sensor such as an encoder for detecting the amount of movement. Furthermore, since the article tracking section 34 is configured to obtain the shifted position information D2 of each article M iteratively with the second period T2, if the position of the article M is displaced on the conveyor 12 after the article detecting section 32 has obtained the initial position information D1 of the article M, the article tracking section 34 can update the shifted position information D2 by tracking the position of the article M and, using the updated shifted position information D2, the robot 14 can comprehend the current position of the article M after the positional displacement and hold the article M.

The above-described configuration of the article transferring device 10 may be described in the form of an article transferring method according to another aspect of the present invention. The article transferring method concerns a method for causing the robot 14 to hold each of a plurality of articles M conveyed on the conveyor 12 and to transfer the article M to another place, and includes the steps of: obtaining initial position information D1 for each of the plurality of articles M being conveyed on the conveyor 12 by performing the image capturing and detection of the plurality of articles M with a first period T1 allowing all of the plurality of articles M to be captured and detected; obtaining shifted position information D2 relative to the initial position information D1 for each of the plurality of articles M being conveyed on the conveyor 12, iteratively with a second period T2 shorter than the first period T1 by performing the image capturing and detection of the plurality of articles M with the second period T2; and based on the shifted position information D2, controlling the robot 14 so that the robot 14 transfers the articles M by holding each of the plurality of articles M while following the conveying motion of the conveyor 12.

Figure 2:
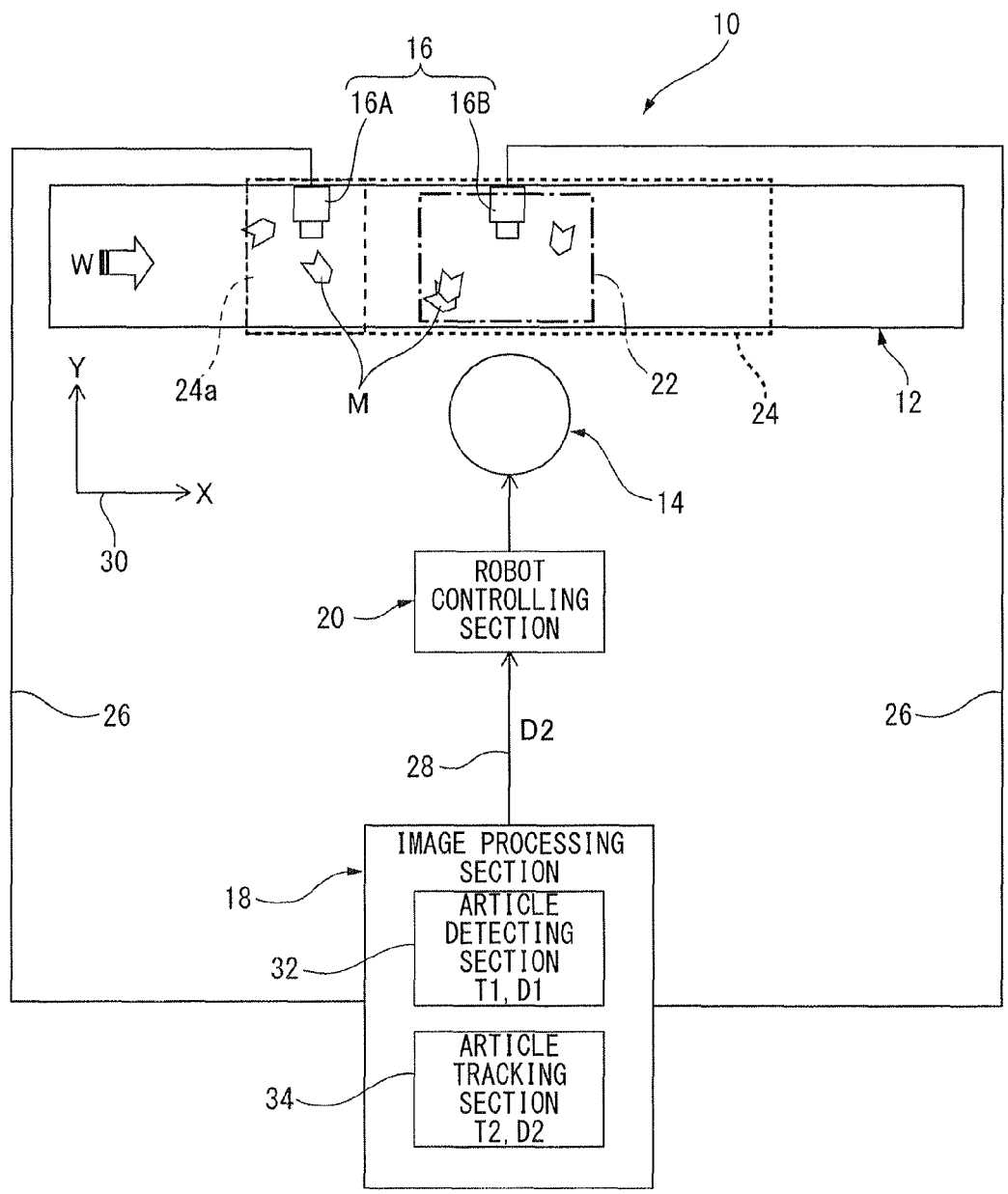
FIG. 2 is a diagram schematically illustrating a modified example of the article transferring device.

FIG. 2 shows a modified example of the article transferring device 10. In this modified example, the image capturing section 16 includes a first camera 16A and a second camera 16B, configured to operate independently of each other. The field of view of the first camera 16A encompasses the aforementioned upstream end portion 24a of the field of view 24 as viewed in the conveying direction of the conveyor. The field of view of the second camera 16B is the same as the field of view 24. The article detecting section 32 is configured to make the first camera 16A capture the image of the article M located within the field of view 24a, and detect the article M based on the data of the image captured by the first camera 16A. The article tracking section 34 is configured to make the second camera 16B capture the image of the article M located within the field of view 24, and detect the article M based on the data of the image captured by the second camera 16B. Both the first camera 16A and the second camera 16B may be digital cameras, and the resolution and the image capturing range, for example, may be set as desired. The first and second cameras 16A and 16B are connected to the image processing section 18 via respective camera cables 26. In this configuration, the image capturing performed by the first camera 16A with the first period T1 and the image capturing performed by the second camera 16A with the second period T2 may be executed concurrently.

Figure 3:
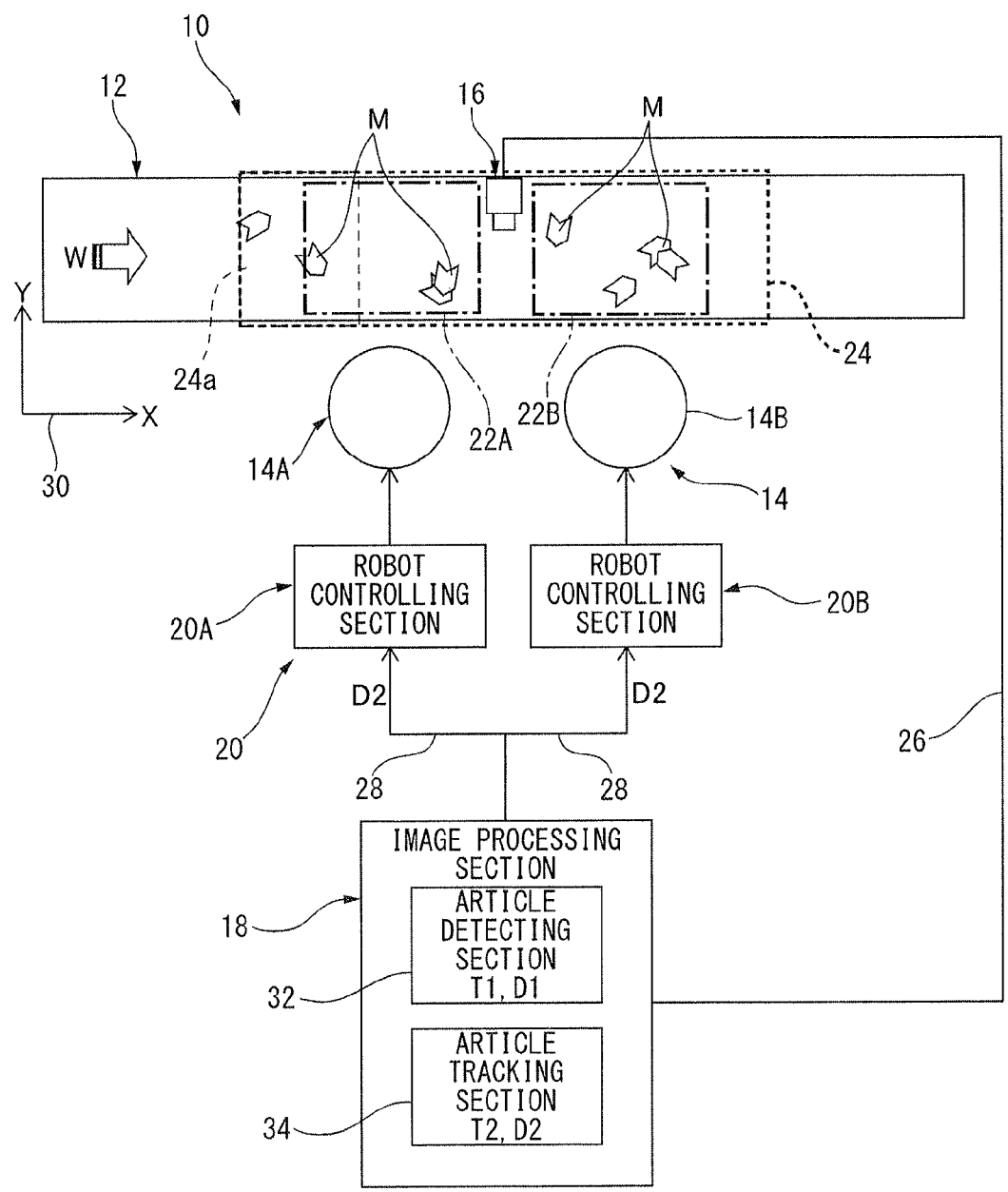
FIG. 3 is a diagram schematically illustrating another modified example of the article transferring device.

FIG. 3 shows another modified example of the article transferring device 10. In this modified example, the robot 14 includes a first mechanical section 14A and a second mechanical section 14B, configured to operate independently of each other, and the robot controlling section 20 includes a first controlling section 20A configured to control the first mechanical section 14A and a second controlling section 20B configured to control the second mechanical section 14B. The first and second mechanical sections 14A and 14B each may have the configuration of any of various known mechanical sections (i.e., manipulators) and may be equipped with any of various known hands (not shown). The first mechanical section 14A is disposed in a predetermined position on one side of the conveyor 12, and operates in such a manner as to hold and pick up the article M in a working space 22A while tracking the article M being conveyed on the conveyor 12 and to transfer the article M to another place. The second mechanical section 14B is disposed in a predetermined position on one side of the conveyor 12 and on the downstream side of the first mechanical section 14A as viewed in the conveying direction of the conveyor, and operates in such a manner as to hold and pick up the article M in a working space 22B while tracking the article M being conveyed on the conveyor 12 and to transfer the article M to another place. The working spaces 22A and 22B are set so as not to overlap each other in order to prevent the first and second mechanical sections 14A and 14B from interfering with each other. Further, the working spaces 22A and 22B are both located within the field of view 24 of the image capturing section 16.

The first controlling section 20A controls the first mechanical section 14A based on the shifted position information D2 so that the first mechanical section 14A transfers the articles M by holding each of the plurality of articles M while following the conveying motion of the conveyor 12. The second controlling section 20B controls the second mechanical section 14B based on the shifted position information D2 so that the second mechanical section 14B transfers the articles M by holding each of the plurality of articles M (other than the articles M picked up by the first mechanical section 14A) while following the conveying motion of the conveyor 12. The first and second controlling sections 20A and 20B are connected to each other via a communication cable 28 and are together connected to the image processing section 18. In this configuration, the first and second controlling sections 20A and 20B may perform such control as to make the first and second mechanical sections 14A and 14B, respectively, hold predetermined numbers of articles M in accordance with a predetermined ratio of operation (i.e., work division ratio). The control performed by considering the work division ratio will be described in further detail in connection with another embodiment to be described later.

Figure 4:
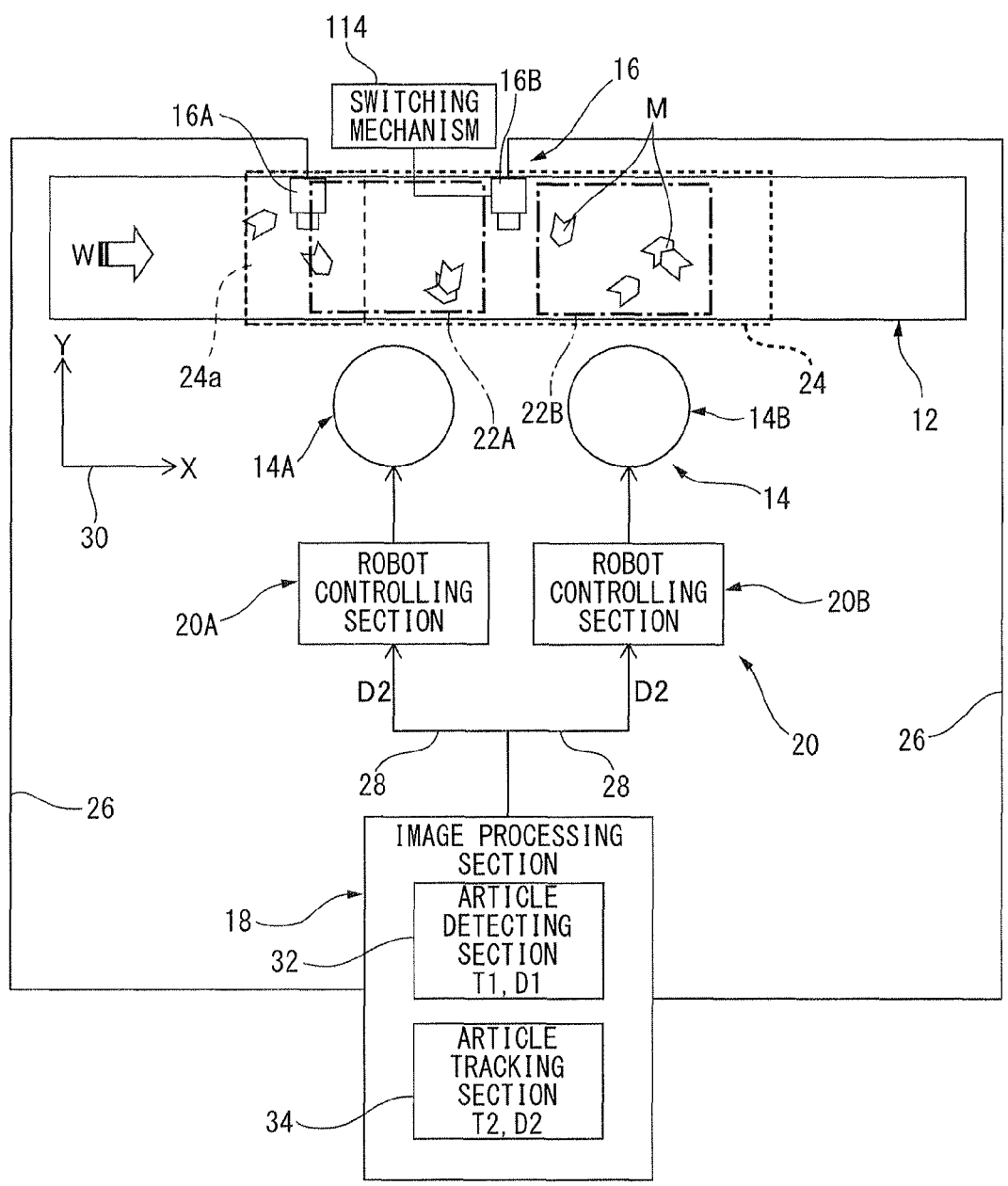
FIG. 4 is a diagram schematically illustrating still another modified example of the article transferring device.

FIG. 4 shows still another modified example of the article transferring device 10. This modified example is a combination of the modified example of FIG. 2 and the modified example of FIG. 3, and includes the first and second cameras 16A and 16B as the image capturing section 16, the first and second mechanical sections 14A and 14B as the robot 14, and the first and second controlling sections 20A and 20B as the robot controlling section 20.

As described above with reference to the several modified examples, the number of cameras constituting the image capturing section 16 and the number of mechanical sections constituting the robot 14 may be chosen suitably according to various factors such as the total number of articles M conveyed on the conveyor 12, the conveying speed of the conveyor 12, the time required for the robot 14 to transfer the articles M to another place, and the work accuracy required. For example, three or more cameras, three or more robot mechanical sections, and three or more robot controlling sections may be provided. When the cameras and robot mechanical sections are disposed along the conveying direction of the conveyor, the camera and robot mechanical section disposed on the downstream side may be configured to do the work that the camera and robot mechanical section disposed on the upstream side did not do.

Figure 5:
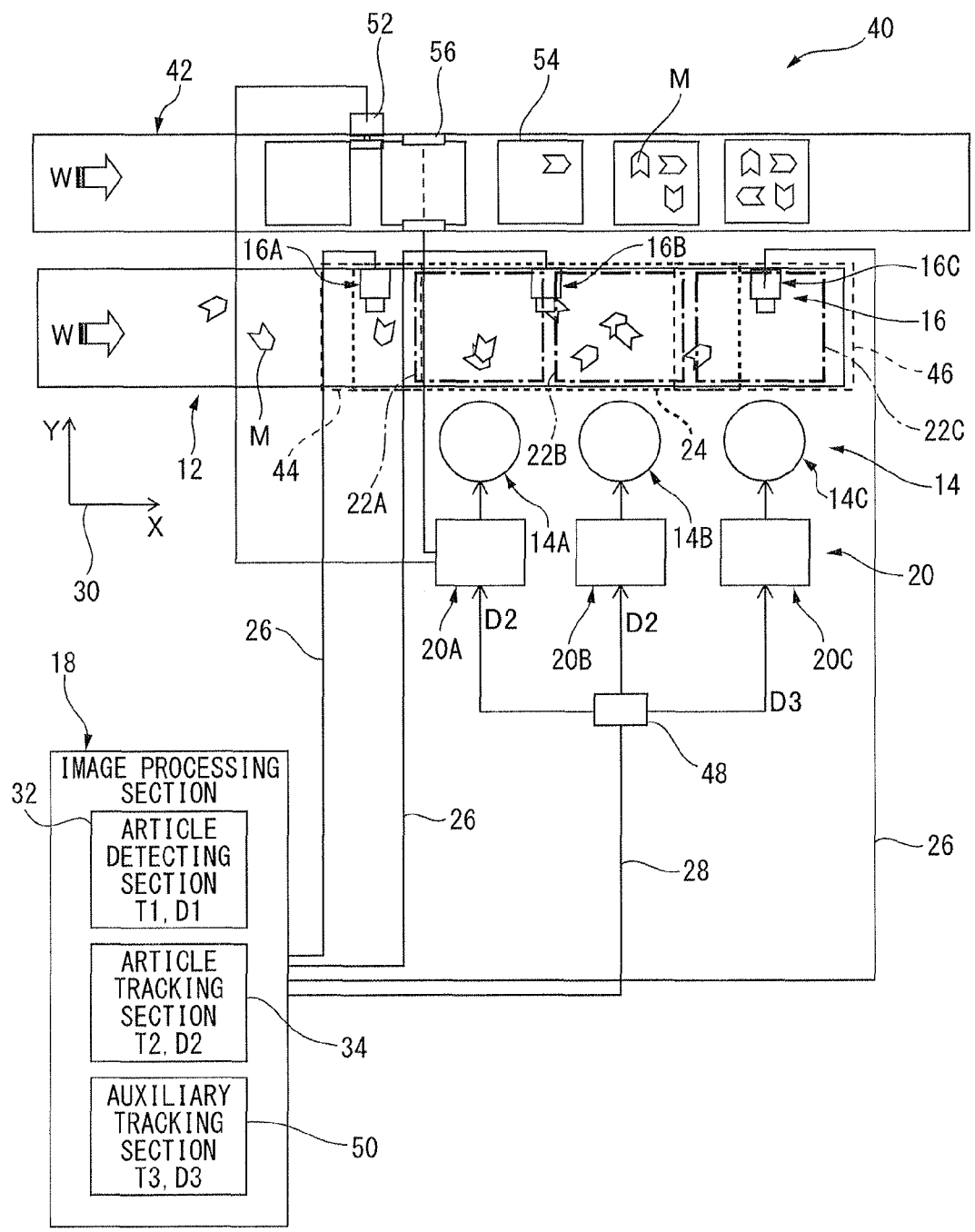
FIG. 5 is a diagram schematically illustrating the configuration of an article transferring device according to another embodiment.

FIG. 5 shows an article transferring device 40 according to another embodiment. The article transferring device 40 has substantially the same basic configuration as the above-described article transferring device 10, except that the number of cameras constituting the image processing section 16, the number of mechanical sections constituting the robot 14, and the number of controlling sections constituting the robot controlling section 20 are different, and that a second conveyor is provided to which the robot 14 transfers the articles M. In the following description, components corresponding to those in the article transferring device 10 are designated by like reference numerals, and further description of such component may be omitted. Further, the configuration pertaining to the details of the article transferring device 10 and omitted from the earlier description may be described in detail below in connection with the configuration of the article transferring device 40.

The article transferring device 40 includes a conveyor 12 configured to convey an article M, a robot 14 configured to hold and transfer the article M, an image capturing section 16 configured to capture an image of the article M, an image processing section 18 configured to control the image capturing section 16 and detect the article M based on data of the image captured by the image capturing section 16, and a robot controlling section 20 configured to control the robot 14 with use of information of the article M detected by the image processing section 18. The article transferring device 40 further includes a second conveyor 42 (hereinafter referred to as a discharge conveyor) to which the robot 14 transfers the article M picked up from the conveyor 12.

The robot 14 includes a first mechanical section 14A, a second mechanical section 14B, and a third mechanical section 14C, configured to operate independently of one another. The first mechanical section 14A is disposed in a predetermined position on one side of the conveyor 12, and operates in such a manner as to hold and pick up the article M in a working space 22A while tracking the article M being conveyed on the conveyor 12 and to transfer the article M to the discharge conveyor 42. The second mechanical section 14B is disposed in a predetermined position on one side of the conveyor 12 and on the downstream side of the first mechanical section 14A as viewed in the conveying direction of the conveyor, and operates in such a manner as to hold and pick up the article M in a working space 22B while tracking the article M being conveyed on the conveyor 12 and to transfer the article M to the exit conveyor 42. The third mechanical section 14C is disposed in a predetermined position on one side of the conveyor 12 and on the downstream side of the second mechanical section 14B as viewed in the conveying direction of the conveyor, and operates in such a manner as to hold and pick up the article M in a working space 22C while tracking the article M being conveyed on the conveyor 12 and to transfer the article M to the discharge conveyor 42. The working spaces 22A, 22B and 22C are set so as not to overlap each other in order to prevent the adjacent mechanical sections 14A, 14B and 14C from interfering with each other. The first to third mechanical sections 14A, 14B and 14C may have substantially the same hardware configuration.

The image capturing section 16 includes a first camera 16A, a second camera 16B and a third camera 16C, configured to operate independently of one another. The first camera 16A has a predetermined field of view 44 (indicated by dashed lines) which extends longitudinally in the conveying direction of the conveyor 12 to encompass a portion thereof and laterally across the entire width of the conveyor 12. The field of view 44 is set in a position corresponding to the earlier described upstream end portion 24a of the field of view 24 as viewed in the conveying direction of the conveyor (see FIG. 1) but shifted upstream by a prescribed distance as viewed in the conveying direction of the conveyor. The field of view of the second camera 16B is the same as the field of view 24. The field of view 44 of the first camera 16A and the field of view 24 of the second camera 16B partially overlap each other. The third camera 16C has a predetermined field of view 46 (indicated by dashed lines) which extends longitudinally in the conveying direction of the conveyor 12 to encompass a portion thereof and laterally across the entire width of the conveyor 12. The field of view 46 is set so as to extend further downstream from the downstream end of the field of view 24 as viewed in the conveying direction of the conveyor. The field of view 46 of the third camera 16C and the field of view 24 of the second camera 16B partially overlap each other. The working spaces 22A and 22B of the first and second mechanical sections 14A and 14B are located within the field of view 24 of the second camera 16B. The working space 22C of the third camera 14C is located within the field of view 46 of the third camera 16C. The first to third cameras 16A, 16B and 16C are connected to the image processing section 18 via respective camera cables 26. The first to third cameras 16A, 16B and 16C may have substantially the same hardware configuration.

The robot controlling section 20 includes a first controlling section 20A configured to control the first mechanical section 14A, a second controlling section 20B configured to control the second mechanical section 14B, and a third controlling section 20C configured to control the third mechanical section 14C. The first controlling section 20A controls the first mechanical section 14A based on the shifted position information D2 so that the first mechanical section 14A transfers the articles M by holding each of the plurality of articles M while following the conveying motion of the conveyor 12. The second controlling section 20B controls the second mechanical section 14B based on the shifted position information D2 so that the second mechanical section 14B transfers the articles M by holding each of the plurality of articles M (other than the articles M picked up by the first mechanical section 14A) while following the conveying motion of the conveyor 12. The third controlling section 20C controls the third mechanical section 14C based on additional shifted position information D3 (to be described later) so that the third mechanical section 14C transfers the articles M by holding each of the plurality of articles M (other than the articles M picked up by the second mechanical section 14B) while following the conveying motion of the conveyor 12. The first to third controlling sections 20A, 20B and 20C are connected to one another via a communication cable 28 and a network hub 48 and are together connected to the image processing section 18. The first to third controlling sections 20A, 20B and 20C may have substantially the same hardware configuration.

The image processing section 18 includes an article detecting section 32 configured to make the first camera 16A capture the image of the article M located within the field of view 44 and detect (or initially detect) the article M based on the data of the image captured by the first camera 16A, an article tracking section 34 configured to make the second camera 16B capture the image of the article M located within the field of view 24 and detect (or track) the article M based on the data of the image captured by the second camera 16B, and an auxiliary tracking section 50 configured to make the third camera 16C capture the image of the article M located within the field of view 46 and detect (or track) the article M based on the data of the image captured by the third camera 16C. The auxiliary tracking section 50 is configured to execute image capturing and detection of a plurality of articles M that move according to the conveying motion of the conveyor 12, with a third period T3 shorter than the first period T1, and obtain additional shifted position information D3 of each of the plurality of articles M iteratively with the third period T3, the additional shifted position information being based on the shifted position information D2.

The auxiliary tracking section 50 has the function of continuing to track each of the plurality of articles M in the field of view 46 of the third camera 16C after the articles M are tracked in the field of view 24 of the second camera 16B by the article tracking section 34. The third camera 16C and the auxiliary tracking section 50 are provided in order to cause the third mechanical section 14C to pick up those articles M that the first and second mechanical sections 14A and 14B did not pickup in their working spaces 22A and 22B among the articles M that the article tracking section 34 tracked in the field of view 24. The third period T3 may be set in accordance with the same condition as the second period T2, and may be set the same as the second period T2.

The image processing section 18 performs the image capturing and detection (i.e., initial detection) with the first period T1 by the article detecting section 32, the image capturing and detection (i.e., tracking) with the second period T2 by the article tracking section 34, and the image capturing and detection (i.e., tracking) with the third period T3 by the auxiliary tracking section 50 in concurrent fashion. The first to third cameras 16A, 16B and 16C may perform the image capturing with the first to third periods T1, T2 and T3, respectively, in concurrent fashion. At this time, taking as the initial values the position and orientation values (or only the position value) contained in the shifted position information D2 iteratively obtained of the article M by the article tracking section 34, and more specifically the final shifted position information D2 obtained of the article M that entered the field of view 46 of the third camera 16C, the auxiliary tracking section 50 continually and iteratively obtains the additional shifted position information D3 representing the constantly changing position and orientation values (or only the position value) (i.e., the amount of change) of the article M by iteratively performing the image capturing and detection of the article M with the third period T3.

In the image processing section 18, the initial position information D1 of each article M obtained by the article detecting section 32 is used for article tracking by the article tracking section 34, and at the same time, the initial position information D1 assembled in the form of the earlier described packet α is sent only to the first controlling section 20A. In this embodiment, the packet α carries, in addition to the earlier described information, a camera ID indicating the first camera 16A that obtained the image data based on which the initial position information D1 was created. Further, in the image processing section 18, the shifted position information D2 of each article M iteratively obtained by the article tracking section 34 and the additional shifted position information D3 of each article M iteratively obtained by the auxiliary tracking section 50 are each assembled in the form of the earlier described packet β each time the information is obtained, and are sent to all of the first to third controlling sections 20A, 20B and 20C. In this embodiment, the packet β carries, in addition to the earlier described information, a camera ID indicating the second or third camera 16B or 16C that obtained the image data based on which the shifted position information D2 or the additional shifted position information D3 was created.

Based on the information of the packet α received from the image processing section 18, the first controlling section 20A creates article information for causing the first to third mechanical sections 14A, 14B and 14C to hold articles M, and assembles the article information in the form of the earlier described packet γ. The information carried in the packet γ includes, in addition to the information of the packet α, the shifted position information D2 or additional shifted position information D3 and the article image capture time that are carried in the information of the packet β received from the image processing section 18 an arbitrary number of times up to that time, including the most recently received one. As each article M is picked up by the first mechanical section 14A and removed from the conveyor 12, the first controlling section 20A deletes the information of the packet γ concerning that article M; on the other hand, for any article M not removed from the conveyor 12 by the first mechanical section 14A, the first controlling section 20A transmits the information of the packet γ to the second controlling section 20B. The second controlling section 20B that received the information of the packet γ from the first controlling section 20A deletes the information of the packet γ when the article M is picked up by the second mechanical section 14B and removed from the conveyor 12; on the other hand, for any article M not removed from the conveyor 12 by the second mechanical section 14B, the second controlling section 20B transmits the information of the packet γ to the third controlling section 20C.

The first to third controlling sections 20A, 20B and 20C each compare the information of the packet β constantly transmitted from the image processing section 18 with the currently held information of the packet γ to recognize the presence of the article M going to enter the working space 22A, 223 or 22C of the corresponding one of the first to third mechanical sections 14A, 143 and 14C or currently traversing the working space 22A, 223 or 22C, respectively. Then, the first and second controlling sections 20A and 203 each control the first or second mechanical section 14A or 14B, respectively, by using the shifted position information D2 of the article M carried in the packet β corresponding to the article M whose presence has been recognized. The third controlling section 20C controls the third mechanical section 14C by using the additional shifted position information D3 of the article M carried in the packet β corresponding to the article M whose presence has been recognized. Under the control of the corresponding controlling section, the first to third mechanical sections 14A, 14B and 14C each hold and pick up the article M while following the conveying motion of the conveyor 12, and transfers the article M from the conveyor 12 to the discharge conveyor 42.

The discharge conveyor 42 is disposed side by side with the conveyor 12 in substantially parallel relationship with each other in a position where the first to third mechanical sections 14A, 14B and 14C may perform the task of transferring the articles M. The discharge conveyor 42 includes a known conveying member capable of conveying a plurality of articles M in one direction (in the drawing, the direction indicated by arrow W) by holding the articles M thereon, and a known driving mechanism for driving the conveying member in a continuous or intermissive manner. The discharge conveyor 42 is equipped with an encoder 52 for detecting the amount of movement of the conveying member. The amount of movement detected by the encoder 52 is sent to the first controlling section 20A, and is shared among the first to third controlling sections 20A, 20B and 20C interconnected via a communication network.

A plurality of trays 54 each capable of holding a predetermined number of articles M in a predetermined arrangement are conveyed on the discharge conveyor 42. The discharge conveyor 42 is equipped with a phototube sensor 56 for detecting the arrival of each tray 54 at a prescribed position. Upon receiving a detection signal of one tray 54 from the phototube sensor 56, the first controlling section 20A reads the amount of movement of the discharge conveyor 42 from the encoder 52 and stores the readout value as the initial value; then, by comparing the constantly updated detection value of the encoder 52 with the stored initial value, the current position of the tray 54 can be determined.

Figures 6A, 6B:
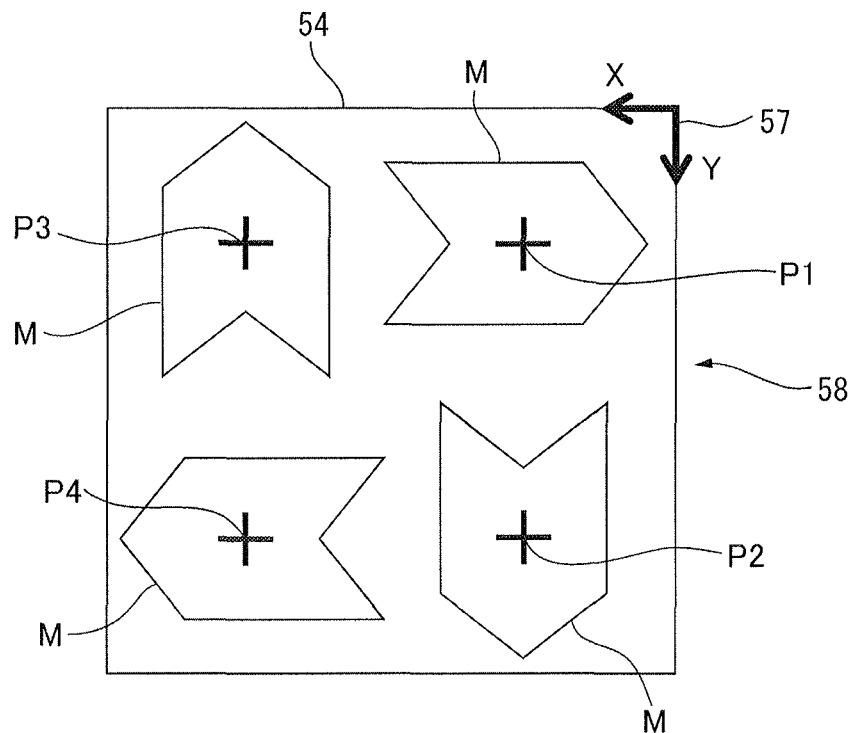
FIG. 6A is a diagram for explaining one example of an arrangement pattern, and shows articles arranged in accordance with the arrangement pattern.
FIG. 6B is a diagram showing an arrangement form that defines the arrangement pattern of FIG. 6A.

Each tray 54 is capable of holding a plurality of articles M in accordance with a predetermined arrangement pattern 58. FIG. 6A shows one example of the arrangement pattern 58 of the articles M on the tray 54. The arrangement pattern 58 includes four pattern elements P1, P2, P3 and P4, each representing the position of one article M. In the example shown in FIG. 6A, an arrangement form 59 (FIG. 6B) is presented which defines the pattern elements P1, P2, P3 and P4 by their coordinate values (X, Y) and relative rotation angles Φ in a coordinate system 57 that has its origin at upper right corner of the tray 54 in a two-dimensional image. As defined in the illustrated arrangement form 59, the coordinate values of P1, P2, P3 and P4 are (X1, Y1), (X1, Y2), (X2, Y1) and (X2, Y2), respectively, and the rotation angles of P1, P2, P3 and P4 are 0°, −90°, 90° and 180°, respectively.

The first to third controlling sections 20A, 20B and 20C control the first to third mechanical sections 14A, 14B and 14C, respectively, so that the articles M are placed one by one on the tray 54 in accordance with the arrangement pattern 58 having the above-described pattern elements P1, P2, P3 and P4. In FIG. 6A, four arrowhead-shaped articles M are shown arranged on the tray in accordance with the arrangement pattern 58. In the drawing, the pattern elements P1, P2, P3 and P4 are each indicated by a mark "+" to facilitate understanding, but the pattern elements P1, P2, P3 and P4 themselves need not have shapes. Further, in the drawing, the four articles M are shown arranged in the arrangement pattern 58 by registering the geometrical center points of the two-dimensional outer shapes of the respective articles M with the pattern elements P1, P2, P3 and P4, respectively, but alternatively, some other common points suitably defined on the respective articles M may be registered with the respective pattern elements P1, P2, P3 and P4.

Figure 7:
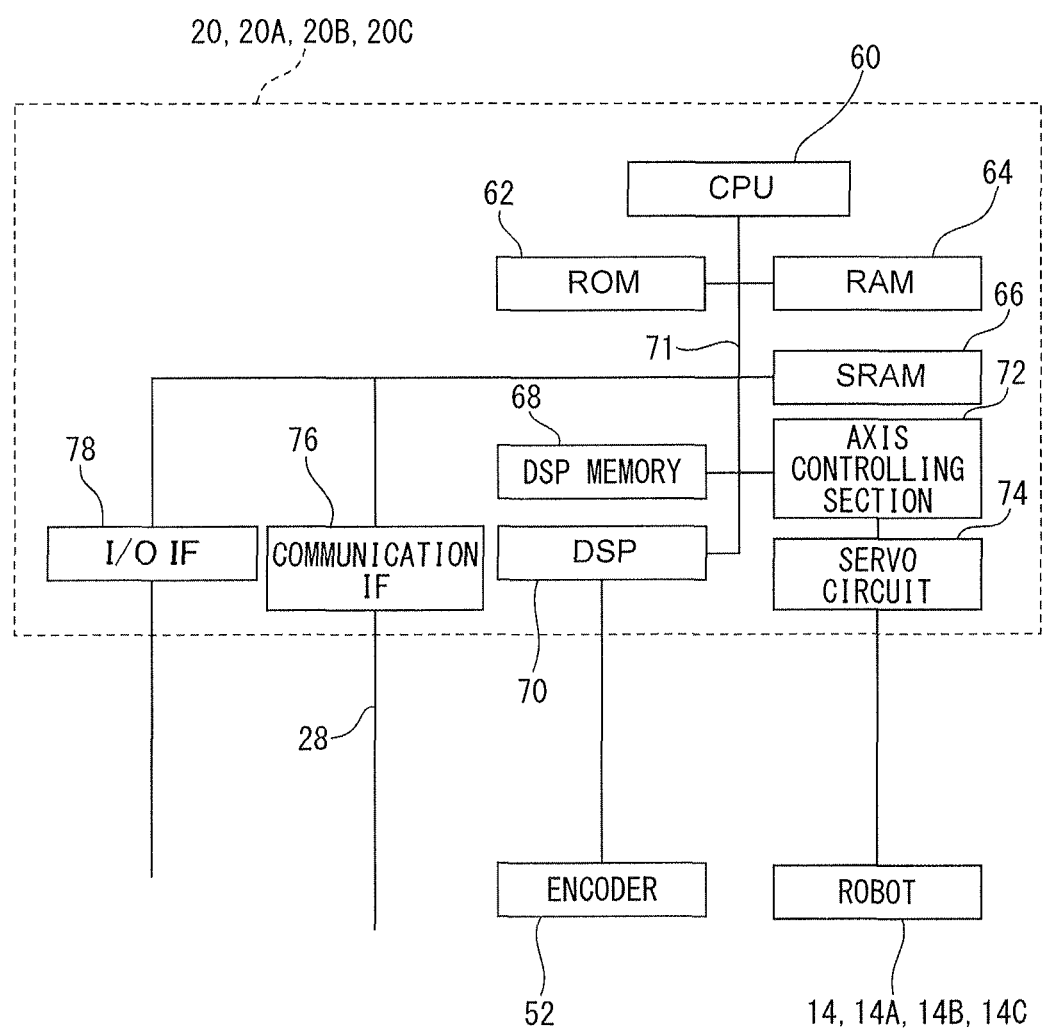
FIG. 7 is a block diagram showing one example of the hardware configuration of a robot controlling section.

FIG. 7 shows one example of the hardware configuration of each of the first to third controlling sections 20A, 20B and 20C or the robot controlling section 20 (FIG. 1). Each of the first to third controlling sections 20A, 20B and 20C or the robot controlling section 20 is equipped with a CPU 60 including a microprocessor. A ROM 62, a RAM 64, an SRAM 66, a digital signal processor (DSP) data memory 68, and a digital signal processor (DSP) 70 are connected to the CPU 60 via a bus 71. The ROM 62A stores a program for controlling the entire system, and the RAM 64 temporarily stores data to be processed by the CPU 60. The SRAM 66 stores an operating program and setup data for each of the first to third controlling sections 20A, 20B and 20C or the robot 14. The DSP 70 is a processor for processing signals output from the encoder 52, and the DSP data memory 68 stores setup parameters as well as data processed by the DSP 70. The DSP 70 has the function of detecting an output from the encoder 52 at a given point in time in accordance with an instruction from the CPU 60 and writing the result to a designated area in the DSP data memory 68.

Each of the first to third controlling sections 20A, 20B and 20C or the robot controlling section 20 includes an axis controlling section 72 for controlling the corresponding one of the mechanical sections 14A, 14B and 14C or the robot 14. The axis controlling section 72 is connected to the corresponding one of the mechanical sections 14A, 14B and 14C or the robot 14 via a servo circuit 74. With this configuration, each of the first to third controlling sections 20A, 20B and 20C or the robot controlling section 20 can control the corresponding one of the mechanical sections 14A, 14B and 14C or the robot 14. Each of the first to third controlling sections 20A, 20B and 20C or the robot controlling section 20 further includes a communication interface 76 and an I/O interface 78, and can communicate, via these interfaces, with the other two of the controlling sections 20A, 20B and 20C and with the image processing section 18 and peripheral devices such as the phototube sensor 56.

Figure 8:
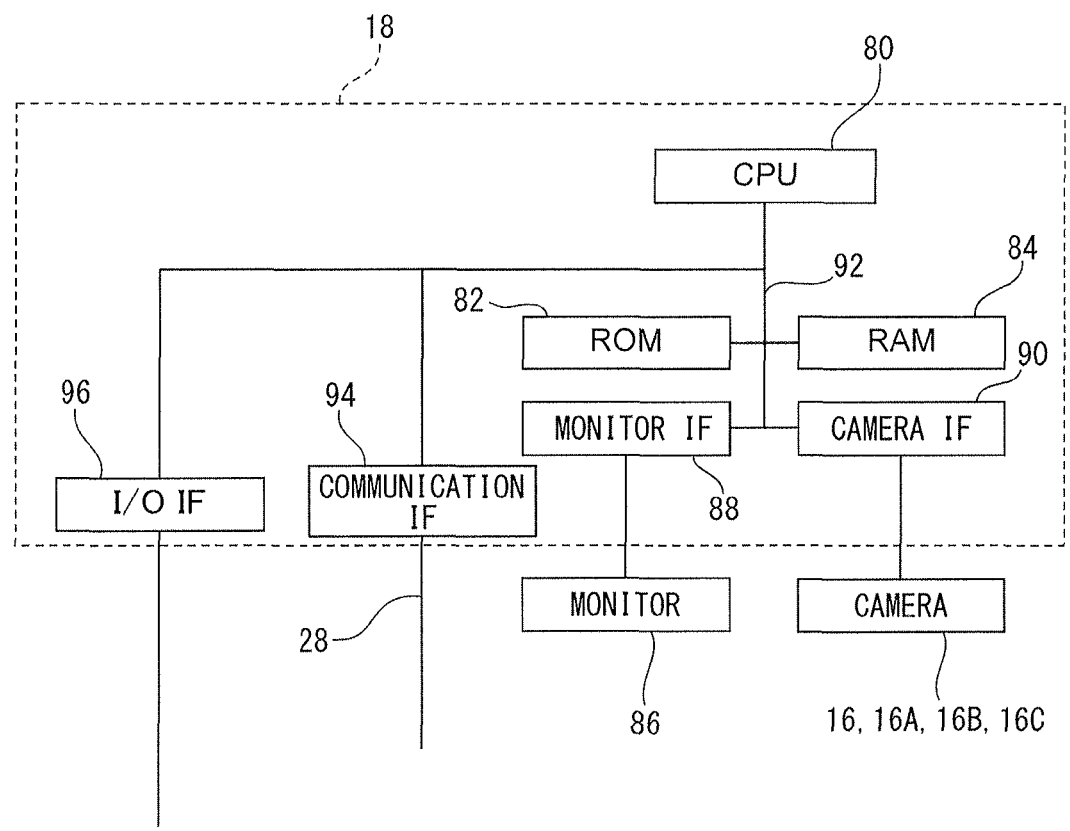
FIG. 8 is a block diagram showing one example of the hardware configuration of an image processing section.

FIG. 8 shows one example of the hardware configuration of the image processing section 18. The image processing section 18 is equipped with a CPU 80 including a microprocessor. A ROM 82, a RAM 84, a monitor interface 88 for connecting to an external monitor 86, and a camera interface for connecting to each of the first to third cameras 16A, 16B and 16C or the image capturing section 16 (FIG. 1) are connected to the CPU 80 via a bus 92. Images captured by each of the first to third cameras 16A, 16B and 16C or the image capturing section 16 are stored into the RAM 84 via the camera interface 90. The camera interface 90 can control each of the cameras 16A, 16B and 16C independently of the others, so that an image capturing operation can always be performed with designated timing regardless of the image imaging conditions of the cameras 16A, 16B and 16C. The data stored in the RAM 84 is analyzed by the CPU 80 and is obtained by the image processing section 18 as the information representing the position and orientation of each article M (initial position information D1, shifted position information D2, and additional shifted position information D3). The image processing section 18 can also obtain external appearance characteristic information such as the shape and color of the article M from the image data stored in the RAM 84. The ROM 82 stores an analysis program and various setup information for the image processing section 18. The CPU 80 supports so-called multi-core, multi-threaded operations, and can concurrently execute the analyses of the image data captured by the first to third cameras 16A, 16B and 16C. The image processing section 18 further includes a communication interface 94 and an I/O interface 96, and can communicate, via these interfaces, with each of the controlling sections 20A, 20B and 20C and peripheral devices.

Figure 9:
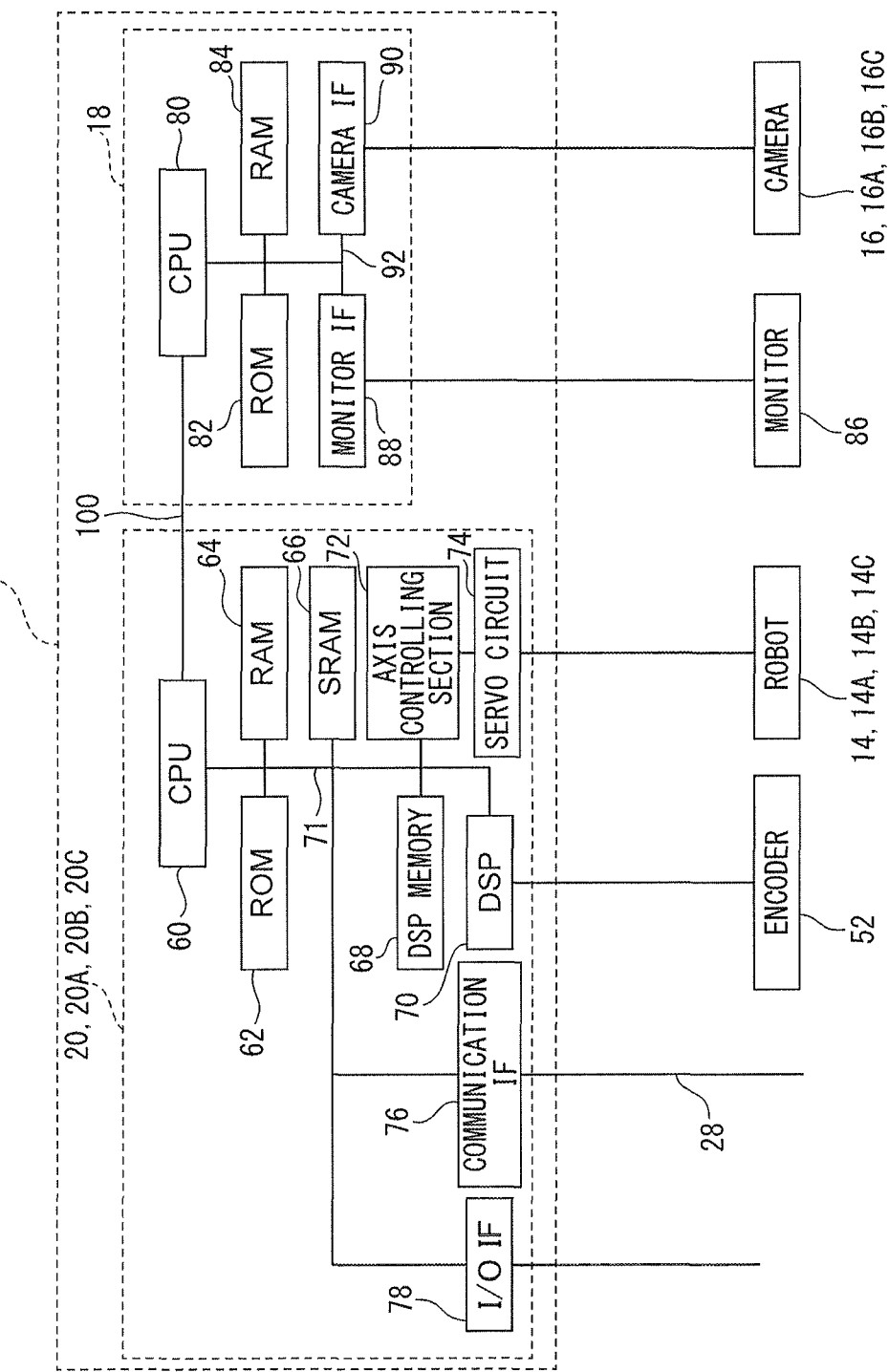
FIG. 9 is a block diagram showing another example of the hardware configuration of the robot controlling section and the image processing section.

As shown in FIG. 9, each of the controlling sections 20A, 20B and 20C or the robot controlling section 20 and the image processing section 18 may be incorporated into a single common control device 98. The CPU 80 in the image processing section 18 is connected to the CPU 60 in each of the controlling sections 20A, 20B and 20C or the robot controlling section 20 via a bus 100 in the control device 98. The CPU 80 in the image processing section 18 can access the SRAM 66 to store various setup information or access the DSP data memory 68 to read information of the encoder 52 via the CPU 60 in each of the controlling sections 20A, 20B and 20C or the robot controlling section 20. Further, the CPU 80 in the image processing section 18 can be connected as needed to the communication interface 76 and the I/O interface 78 via the CPU 60 in each of the controlling sections 20A, 20B and 20C or the robot controlling section 20. In this case, the communication interface 94 and the I/O interface 96 may be omitted.

Figure 10:
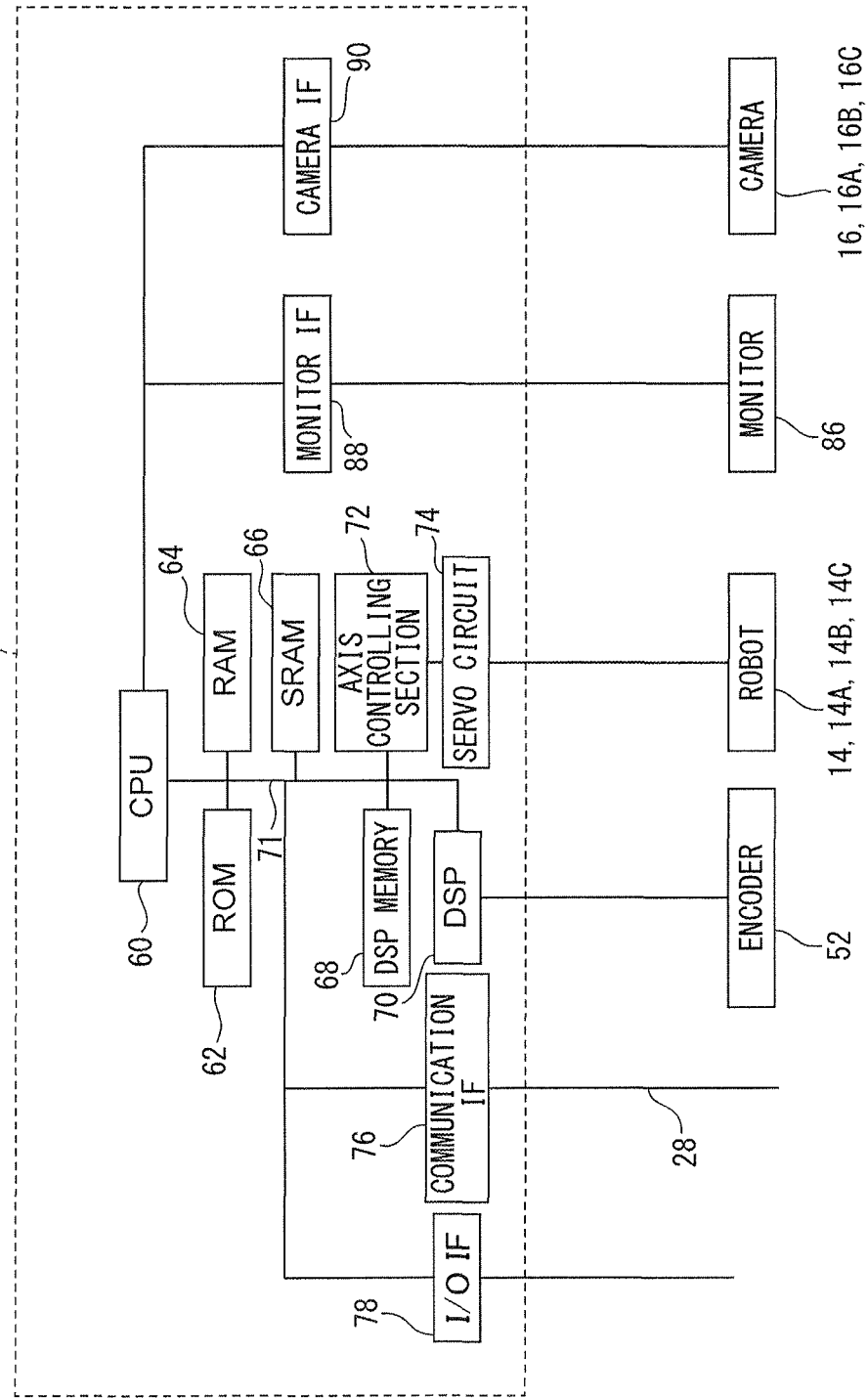
FIG. 10 is a block diagram showing still another example of the hardware configuration of the robot controlling section and the image processing section.

In the control device 98, the CPU 60, ROM 62 and RAM 64 in each of the controlling sections 20A, 20B and 20C or the robot controlling section 20 may be used to substitute for the CPU 80, ROM 82 and RAM 84 in the image processing section 18. FIG. 10 illustrates the control device 98 having such a simplified hardware configuration.

Figure 11:
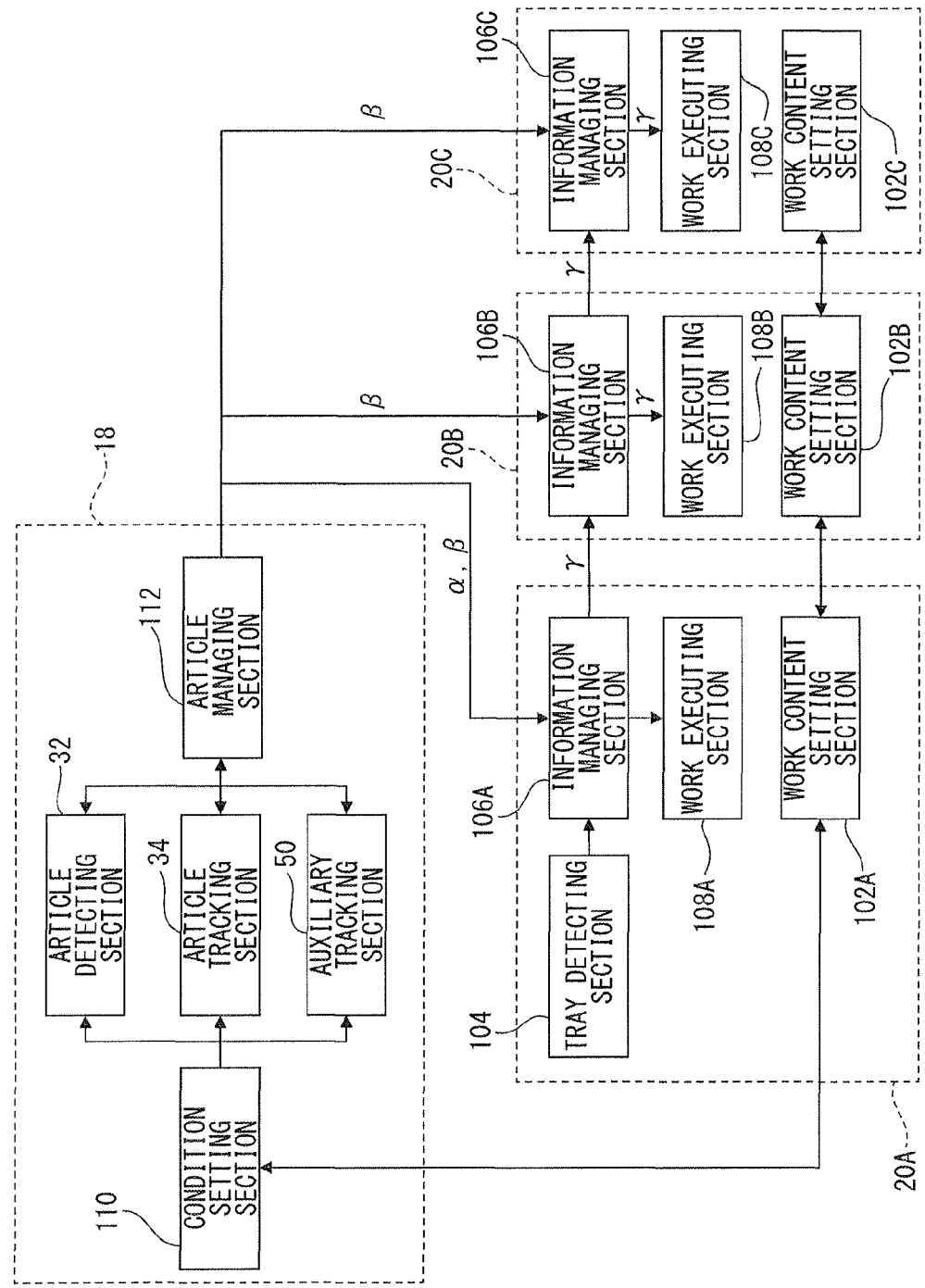
FIG. 11 is a functional block diagram illustrating the robot controlling section and the image processing section in the embodiment of FIG. 5.

FIG. 11 shows in functional block form the various sections that are incorporated in the image processing section 18 and the first to third controlling sections 20A, 20B and 20C of the article transferring device 40 to handle information relating to the articles M and information relating to the pickup and transfer work for the articles M. In the drawing, arrows indicate the flow of the information relating to the articles M and the flow of the information relating to the pickup and transfer work for the articles M.

As shown in FIG. 11, the first to third controlling sections 20A, 20B and 20C include work content setting sections 102A, 102B and 102C, respectively. The work content setting sections 102A, 102B and 102C set the work content relating to the article pickup and transfer work, such as the work division ratio among the first to third mechanical sections 14A, 14B and 14C (FIG. 5), the arrangement pattern 58 of the articles M on the tray 54, and the working spaces 22A, 22B and 22C (FIG. 5) on the conveyor 12. The work content set by any one of the work content setting sections 102A, 102B and 102C can be transmitted to any other one of the work content setting sections 102A, 102B and 102C in the controlling sections 20A, 20B and 200 via a communication network so that the work content can be shared among the work content setting sections 102A, 102B and 102C in the controlling sections 20A, 20B and 20C.

Figure 12:
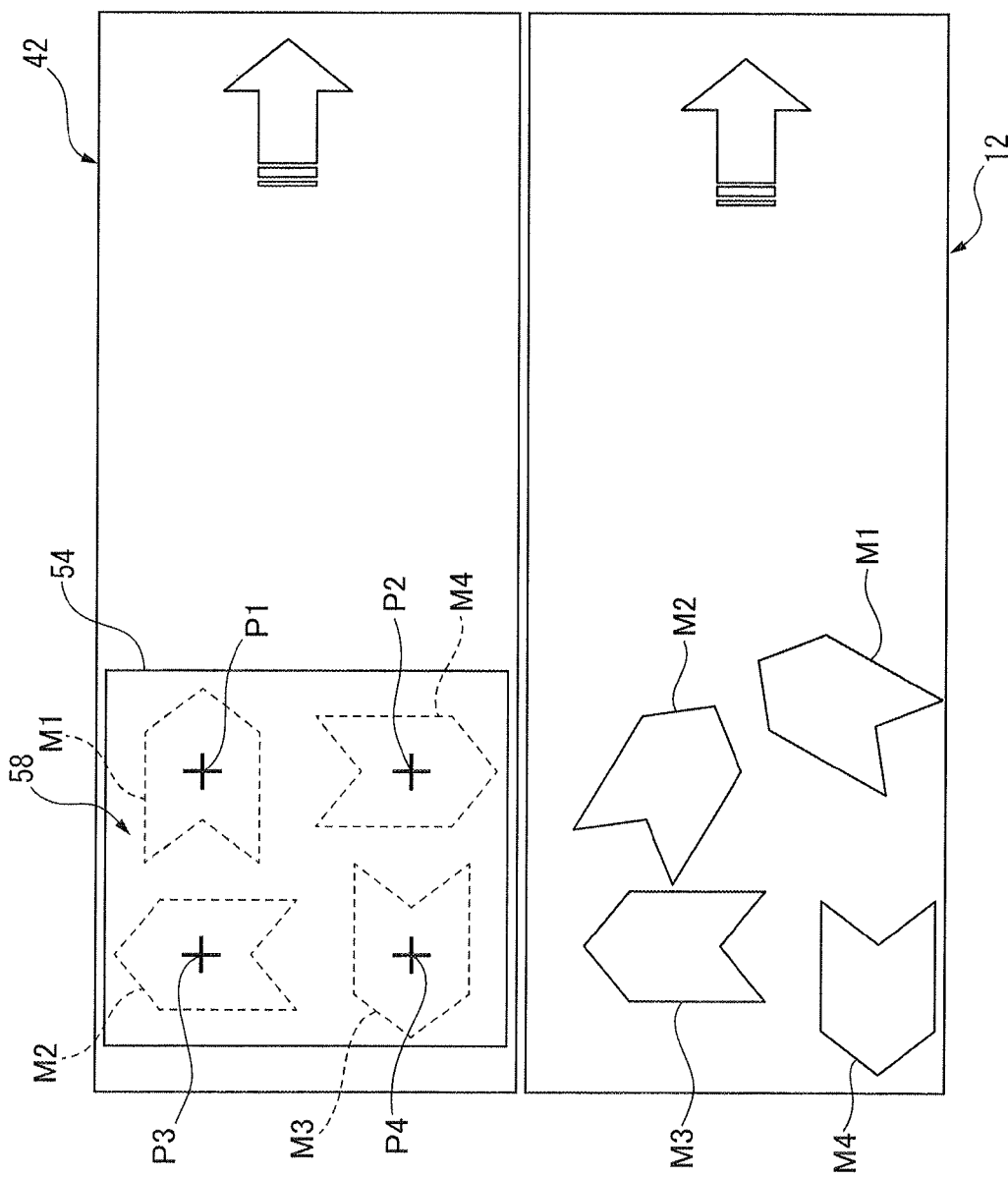
FIG. 12 is a diagram schematically illustrating one example of article hold and transfer work.

The work division ratio among the first to third mechanical sections 14A, 14B and 14C will be described below. For example, consider a situation where the articles M1, M2, M3 and M4 arranged in this order from the top as shown in FIG. 12 are conveyed on the conveyor 12 and supplied to the working spaces 22A, 22B and 22C (FIG. 5) and are picked up by the first to third mechanical sections 14A, 14B and 14C (FIG. 5) and transferred onto the tray 54 on the discharge conveyor 42 so that the articles M1, M2, M3 and M4 will be arranged in the previously described arrangement pattern 58. One example of the article pickup and transfer work performed by the respective mechanical sections 14A, 14B and 14C will be described below for the case where the work division ratio among the first to third mechanical sections 14A, 14B and 14C is set to 1:1:1 in the above situation.

First, of the first to third mechanical sections 14A, 14B and 14C (FIG. 5), the first mechanical section 14A disposed in the most upstream position picks up the first supplied article M1 from the conveyor 12 and places it onto the pattern element P1 on the tray 54 in accordance with the arrangement pattern 58. Then, the first mechanical section 14A lets the articles M2 and M3 pass by so that the downstream second and third mechanical sections 14B and 14C can handle them to satisfy the specified work division ratio R=1:1:1, and thereafter picks up the last article M4 and places it onto the pattern element P2 on the tray 54 in accordance with the arrangement pattern 58. The second mechanical section 14B picks up the article M2, the first of the two articles that the first mechanical section 14A let pass by, from the conveyor 12 and places it onto the pattern element P3 on the tray 54 in accordance with the arrangement pattern 58. Then, the third mechanical section 14C picks up the remaining article M3 from the conveyor 12 and places it onto the pattern element P4 on the tray 54 in accordance with the arrangement pattern 58. At this point in time, the article pickup and transfer work division ratio among the first to third mechanical sections 14A, 14B and 14C is 2:1:1.

When a plurality of articles M (not shown) are supplied following the articles M1 to M4, the first mechanical section 14A lets the first two articles M pass by in order to satisfy the specified work division ratio R=1:1:1, and thereafter picks up and transfers the third article M onto the next tray 54. Then, the second and third mechanical sections 14B and 14C each pick up one of the articles that the first mechanical section 14A let pass by, and transfer it onto that next tray 54. At this point in time, the article pickup and transfer work division ratio among the first to third mechanical sections 14A, 14B and 14C is 3:2:2. By repeating this process, the first to third mechanical sections 14A, 14B and 14C perform the pickup and transfer work on all the articles M conveyed on the conveyor 12 until finally the work division ratio R=1:1:1 is satisfied.

In the example of the work described above, the first to third mechanical sections 14A, 14B and 14C pick up the plurality of articles M from the conveyor 12 in the order in which the articles M are supplied, and transfer them onto the tray 54 in the order of the pattern elements P1 to P4 in the arrangement pattern 58. Further, in order to achieve the division ratio closest to the work division ratio R, the first to third mechanical sections 14A, 14B and 14C in this order determine whether the respective articles M are to be picked up or not. A desired work rule may be determined in advance by the user of the article transferring device 40 and may be stored in advance in the SRAMs 66 in the first to third controlling sections 20A, 20B and 20C.

Referring back to FIG. 11, the first controlling section 20A includes a tray detecting section 104, an information managing section 106A, and a work executing section 108A. The second controlling section 20B includes an information managing section 106E and a work executing section 108B. The third controlling section 20C includes an information managing section 106C and a work executing section 108C.

The tray detecting section 104 detects the tray 54 (FIG. 5) based on an input of a tray detection signal from the phototube sensor 56 (FIG. 5), reads the detection value from the encoder 52 (FIG. 5) of the discharge conveyor 42 (FIG. 5) at the instant of detection, and transfers the detection value to the information managing section 106A. If the position of the phototube sensor 56 and the traveling direction of the discharge conveyor 42 are associated in advance by the work content setting section 102A with a robot coordinate system of the first mechanical section 14A (FIG. 5) (in the embodiment of FIG. 1, the conveyor coordinate system 30), the information managing section 106A can obtain the position of the detected tray 54 and the coordinate values and relative rotation angles of the pattern elements P1 to P4 of the arrangement pattern 58 (FIG. 12) in the robot coordinate system by using the detection value of the encoder 52 transferred upon detection of the tray from the tray detecting section 104. Information concerning the coordinate values and relative rotation angles of the pattern elements P1 to P4 is temporarily held in the information managing section 106A, but information relating to any one of the pattern elements P1 to P4 on which the first mechanical section 14A did not place the article M is transferred as the information of the packet γ to the information managing section 106B in the second controlling section 20B via the communication network. Similarly, of the information of the pattern elements P1 to P4 held in the information managing section 106B, information relating to any one of the pattern elements P1 to P4 on which the second mechanical section 14B did not place the article M is transferred as the information of the packet γ to the information managing section 106C in the third controlling section 20C via the communication network.

As shown in FIG. 11, the image processing section 18 includes a condition setting section 110 and an article managing section 112 in addition to the article detecting section 32, the article tracking section 34, and the auxiliary tracking section 50. The condition setting section 110 sets various conditions for detecting or tracking each article M, such as a teaching model image for the article M to be detected or tracked, parameters (coordinate values, rotation angles, dimensions, etc.) used for article detection, and calibration data for the first to third cameras 16A, 16B and 16C (FIG. 5). The condition setting section 110 can obtain information concerning the working spaces 22A, 22B and 22C of the first to third mechanical sections 14A, 14B and 14C (FIG. 5) by communicating with the work content setting section 102A in the first controlling section 20A.

The article detecting section 32 starts the initial detection of the article M by using the first camera 16A when the conveyor 12 has moved for a predetermined period of time from the start of the work. Alternatively, the initial detection of the article M may be started when an external sensor such as a phototube sensor (not shown) has detected the movement of the conveyor 12 for a predetermined period of time. The article detecting section 32 can obtain the initial position information D1 (FIG. 5) of the article M by using any of various known detection algorithms, such as a method that detects the article M by searching for an image that matches a preregistered model image from among the images captured by the first camera 16A (e.g., a normalized correlation method), a method that extracts the contour of the article M from the preregistered model image and, based on the information of the detected contour, obtains the position information of the article M in the image captured by the first camera 16A (e.g., a generalized Hough transform method), or a method that obtains the position information of the article M by detecting from the image captured by the first camera 16A a region having an area size that falls within a preregistered range (e.g., a blob detection method).

Upon succeeding in the initial detection of the article M, the article detecting section 32 sets a flag (hereinafter referred to as a new detection flag) indicating that the detected article M is a newly detected one, and transfers the new detection flag to the article managing section 112 together with such information as the initial position information D1 of the detected article M, the camera ID of the first camera 16A used to capture the image of the article M, the image capture time of the article M, and the new article ID of the article M. The article managing section 112 transfers these pieces of information received from the article detecting section 32 on to the article tracking section 34, while also transferring the information as the information of the packet α to the information managing section 106A in the first controlling section 20A.

The article tracking section 34 starts the tracking of the article M by using the second camera 16B when the article M corresponding to the initial position information D1 received from the article managing section 112 has entered the field of view 24 (FIG. 5) of the second camera 16B. The article tracking section 34 tracks the article M by taking the initial position information D1 of the article M received from the article managing section 112 as the initial value. The unique article ID assigned to the article M at the time of the initial detection by the article detecting section 32 is retained throughout the process performed by the article tracking section 34. The tracking of the article M by the article tracking section 34 is performed in a successive manner by comparing the various pieces of information (position information and external appearance characteristic information) obtained at the time of the current image capture with the various pieces of information obtained at the time of the previous or an earlier image capture, based on the image data that the second camera 16B generated by capturing the image of the article M iteratively with the extremely short second period T2. As the detection algorithm for performing this kind of successive tracking, particle filtering (also called a particle filter or sequential Monte Carlo method) that can estimate a nonlinear, non-Gaussian system, for example, may be used (for particle filtering, refer, for example, to "Journal of the Robotics Society of Japan, Vol. 29, No. 5, pp. 427-430, 2011").

The article tracking section 34 transfers information, such as the most recent shifted position information D2 (FIG. 5) of the article M obtained during the tracking, the camera ID of the second camera 16B used to capture the image of the article M, the image capture time of the article M, and the article ID of the article M, to the article managing section 112 in a successive manner. The article managing section 112 transfers these pieces of information received from the article tracking section 34 on to the auxiliary tracking section 50, while also transferring the information as the information of the packet β to the information managing sections 106A, 106B and 106C in the first to third controlling sections 20A, 20B and 20C.

The auxiliary tracking section 50 starts the tracking of the article M by using the third camera 16C when the article M corresponding to the shifted position information D2 received from the article managing section 112 has entered the field of view 46 (FIG. 5) of the third camera 16C. The auxiliary tracking section 50 tracks the article M by taking as the initial value the shifted position information D2 received from the article managing section 112 when the article M has entered the field of view 46 (FIG. 5) of the third camera 16C. The tracking process performed by the auxiliary tracking section 50 is substantially the same as the tracking process performed by the article tracking section 34 described above, except that the third camera 16C is used to capture the image of the article M. The auxiliary tracking section 50 transfers information, such as the most recent additional shifted position information D3 (FIG. 5) of the article M obtained during the tracking, the camera ID of the third camera 16C used to capture the image of the article M, the image capture time of the article M, and the article ID of the article M, to the article managing section 112 in a successive manner. The article managing section 112 that received these pieces of information received from the auxiliary tracking section 50 transfers the information as the information of the packet β to the information managing sections 106A, 106B and 106C in the first to third controlling sections 20A, 20B and 20C.

Instead of the above-described particle filter method, the article tracking section 34 and the auxiliary tracking section 50 may use as the detection algorithm for article tracking any one of various known pattern recognition algorithms such as the normalized correlation method, the generalized Hough transform method, or the blob detection method as in the article detecting section 32. The normalized correlation method, the generalized Hough transform method, the blob detection method, etc. usually provide higher detection accuracy than the particle filter method, but the processing speed is slower. When using the normalized correlation method, the generalized Hough transform method, the blob detection method, or the like as the method for article tracking, an increase in the time required for tracking can be prevented by narrowing the range of the detection parameter (coordinate values, rotation angle, dimensions, area size, etc.) or the detection search range in the two-dimensional image captured by the second or third camera 16B or 16C, compared with the range used by the article detecting section 32 for the initial detection. For example, when using the rotation angle as the detection parameter, the article detecting section 32 obtains the initial position information D1 of the article M by performing the initial detection, for example, within the range of ±180 degrees because, at this time, the position and orientation of the article M is unknown; on the other hand, when the article tracking section 34 and the auxiliary tracking section 50 use the normalized correlation method, the generalized Hough transform method, the blob detection method, or the like, the article tracking section 34 and the auxiliary tracking section 50 can perform the article detection (tracking) by narrowing the range down to within ±5 degrees on the assumption that the position and orientation does not change substantially from the result of the initial detection or the previous tracking.

Next, one example of the process for tracking the articles M performed by the article tracking section 34 (FIG. 11) in the image processing section 18 will be described with reference to FIG. 13. The tracking process performed by the auxiliary tracking section 50 (FIG. 11) in the image processing section 18 is substantially the same as the tracking process by the article tracking section 34 described below.

Figure 13:
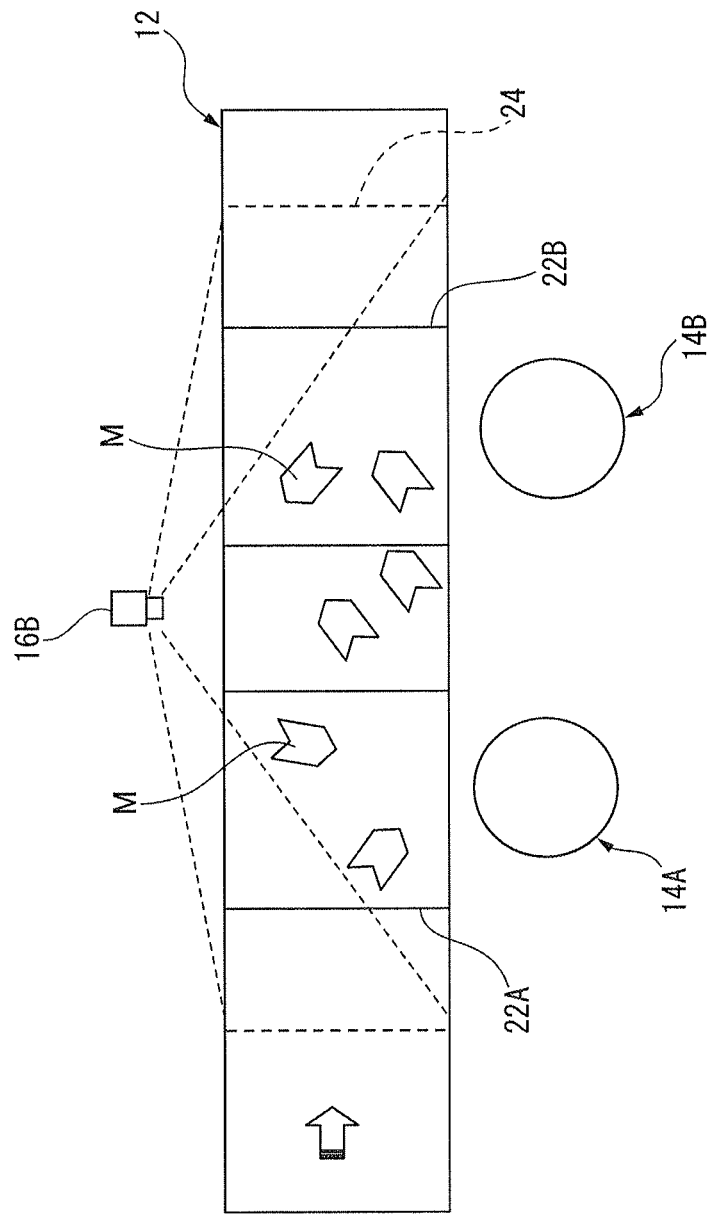
FIG. 13 is a diagram for explaining one example of an article tracking process.

As shown in FIG. 13, a plurality of articles M arranged in a random manner are conveyed on the conveyor 12; here, when any one of the articles M is located within the working space 22A, the first mechanical section 14A holds and picks up the article M, and when another one of the articles M is located within the working space 22B, the second mechanical section 14B holds and picks up the article M. On the other hand, the second camera 16B captures the images of all the articles located within the field of view 24 iteratively with the second period T2. The computational burden of the article tracking section 34 performing the tracking process is largely determined by the size of the image data captured by the second camera 16B, the type of the algorithm used for the article detection, the number of articles M to be detected, and the range of the article detection parameter. Assuming that the number of articles M to be detected and the algorithm used are respectively the same, the computational burden of the article tracking section 34 can be reduced by reducing the resolution of the image data or by narrowing the range of the detection parameter.

The resolution, i.e., the size, of the image data captured by the second camera 16B affects the accuracy with which the article tracking section 34 detects each article M, which in turn affects the accuracy of the article holding operation performed by the first and second mechanical sections 14A and 14B. In reality, within the working spaces 22A and 22B of the first and second mechanical sections 14A and 14B, high detection accuracy and high operation accuracy are required, but outside the working spaces 22A and 22B, the detection accuracy has no relevance to the holding operation performed by the first and second mechanical sections 14A and 14B. In view of this, if the resolution of the image data used outside the working spaces 22A and 22B is reduced compared with that of the image data used inside the working spaces 22A and 22B in the field of view 24 of the second camera 16B, then the computational burden of the article tracking section 34 can be reduced.

As shown in FIG. 11, the condition setting section 110 in the image processing section 18 communicates with the work content setting section 102A in the first controlling section 20A and obtains information about the locations on the conveyor 12 of the working spaces 22A and 22B of the first and second mechanical sections 14A and 14B as position information in the conveyor coordinate system 30. The article tracking section 34 may be configured to detect an article M located inside the working space 22A, 22B with use of image data of a first resolution corresponding to a required detection accuracy, and to detect an article M located outside the working space 22A, 22B with use of image data of a second resolution lower than the first resolution, based on the information of the working spaces 22A and 22B obtained by the condition setting section 110. This configuration serves to reduce the computational burden of the article tracking section 34, compared with the configuration in which all the articles located within the field of view 24 of the second camera 16B are detected using the image data of the first resolution. In the auxiliary tracking section 50 also, the computational burden of the tracking process can be reduced using a similar technique.

In the above configuration, the article tracking section 34 is configured to be able to obtain the first-resolution (or high-resolution) image data captured by imaging the inside of the working spaces 22A and 22B of the first and second mechanical sections 14A and 14B (FIG. 13) and the second-resolution (or low-resolution) image data captured by imaging the outside of the working spaces 22A and 22B. Similarly, the auxiliary tracking section 50 is configured to be able to obtain the first-resolution image data captured by imaging the inside of the working space 22C of the third mechanical section 14C (FIG. 5) and the second-resolution image data captured by imaging the outside of the working space 22C. In order to obtain the image data of different resolutions, the second or third camera 16B or 16C may be equipped with a switching mechanism 114 (FIG. 4) configured to switch a resolution between the first resolution and the second resolution. In this configuration, the second or third camera 16B or 16C images the entire field of view 24 or 46 with the first resolution as well as the second resolution so that the article tracking section 34 or the auxiliary tracking section 50 can detect the articles M located inside the working spaces 22A and 22B or the working space 22C by using the first-resolution image data and detect the articles M located outside the working spaces 22A and 22B or the working space 22C by using the second-resolution image data. If the second or third camera 16B or 16C is not equipped with the switching mechanism 114, the second or third camera 16B or 16C images the field of view 24 or 46 with a prescribed resolution; in this case, the article tracking section 34 or the auxiliary tracking section 50 can obtain the second-resolution image data in addition to the first-resolution image data by reducing the resolution of the image data using a known image processing technique.

Instead of or in addition to the resolution selectable configuration described above, the article tracking section 34 may be configured to be able to select and use one or the other of two detection algorithms, of which the first detection algorithm ensures a first processing speed and first accuracy and the second detection algorithm ensures a second processing speed higher than the first processing speed and/or a second accuracy lower than the first accuracy. In this case, the article tracking section 34 may be configured to detect an article M located inside the working spaces 22A and 22B of the first and second mechanical sections 14A and 14B with use of the first detection algorithm, and to detect an article M located outside the working spaces 22A and 22B with use of the second detection algorithm. The normalized correlation method, the generalized Hough transform method, the blob detection method, or the like may be employed as the first detection algorithm. On the other hand, the particle filter method may be employed as the second algorithm. The auxiliary tracking section 50 may be configured in a similar way.

For example, from the image data that the second camera 16B generated by imaging the entire field of view 24 with the second resolution (or the low resolution), the article tracking section 34 detects the articles M in the entire field of view 24 by using the second detection algorithm (or the particle filter method). In the tracking process performed by the article tracking section 34, this article detection is performed as a preparatory step to the step of obtaining the accurate shifted position information D2 of each article M. Next, from the image data that the second camera 16B generated by imaging the entire field of view 24 with the first resolution (or the high resolution), or more precisely, from the image data of an area containing the first and second working spaces 22A and 22B and slightly larger than the first and second working spaces 22A and 22B, the article tracking section 34 detects any article M at least a portion of which is located inside one or the other of the first and second working spaces 22A and 22B by using the first detection algorithm (or the normalized correlation method, generalized Hough transform method or blob detection method). In the tracking process performed by the article tracking section 34, this article detection is performed as a step complementary to the step of obtaining the accurate shifted position information D2 of each article M. When using the first detection algorithm (or the normalized correlation method, generalized Hough transform method or blob detection method), since the area containing the articles M is already narrowed down to a certain extent within the range of the detection parameter (coordinate values, rotation angle, dimensions, area size, etc.) by the preparatory detection performed using the second detection algorithm (or the particle filter method), an increase in the time required for tracking can be prevented by correspondingly narrowing the range of the detection parameter (coordinate values, rotation angle, dimensions, area size, etc.).

For any articles M located inside the common working spaces 22A and 22B, the article tracking section 34 can perform the tracking process by using detection algorithms achieving different processing speeds and different accuracies. For example, the detection using the first (high resolution) detection algorithm can be performed only on a prescribed number of articles M, as counted from the downstream side in the conveying direction, that are highly likely to be picked up by the first or second mechanical section 14A or 14B. For example, when the hand of the first or second mechanical section 14A or 14B is configured to be able to hold two articles M together, the article tracking section 34 may be configured so as to detect only two articles, as counted from the downstream side, with high accuracy in each cycle of the article tracking process which is performed repeatedly. According to this configuration, the computational burden of the article tracking section 34 can be alleviated by reducing the number of articles M to be detected.

The article transferring device 10 of FIG. 1 may be configured in a similar way to that described above. In the article transferring device 10, the article tracking section 34 may be configured to obtain a first-resolution image data captured by imaging the inside of the working space 22 where the robot 14 performs the article pickup work and a second-resolution image data captured by imaging the outside of the working space 22, the second resolution of the second-resolution image data being lower than the first resolution of the first-resolution image data; and also be configured to detect an article M located inside the working space 22 with use of the first-resolution image data and an article M located outside the working space 22 with use of the second-resolution image data. Further, in the article transferring device 10, the article tracking section 34 may be configured to select either a first detection algorithm that ensures a first processing speed and a first accuracy or a second detection algorithm that ensures a second processing speed and/or a second accuracy, the second processing speed being higher than the first processing speed and the second accuracy being lower than the first accuracy, and to use the selected one of the detection algorithms; and also be configured to detect an article M located inside the working space 22 of the robot 14 with use of the first detection algorithm and an article M located outside the working space 22 with use of the second detection algorithm.

Next, another example of the process for tracking the articles M performed by the article tracking section 34 (FIG. 11) in the image processing section 18 will be described with reference to FIG. 14. The tracking process performed by the auxiliary tracking section 50 (FIG. 11) in the image processing section 18 is substantially the same as the tracking process by the article tracking section 34 described below.

Figure 14:
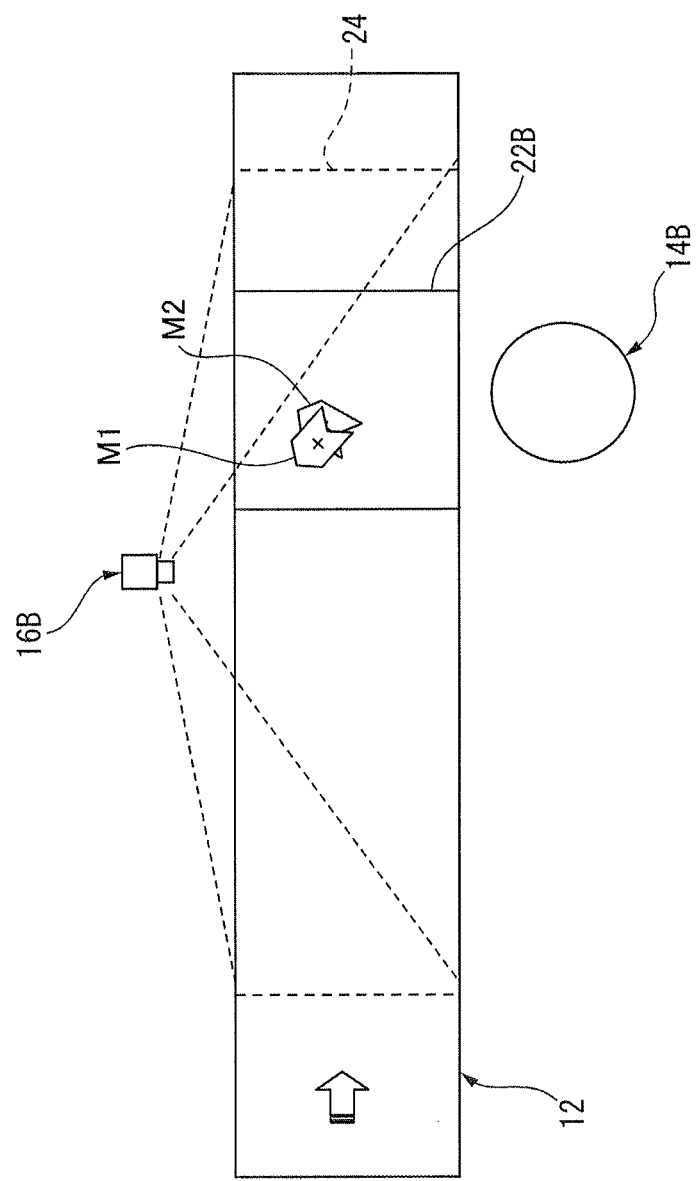
FIG. 14 is a diagram for explaining another example of an article tracking process.

As shown in FIG. 14, consider a situation where two articles M1 and M2, one overlapping the other on the conveyor 12, are supplied to the working space 22B of the second mechanical section 14B. In this situation, it is assumed that the article M2 the major portion of which is hidden behind the article M1 has failed to be initially detected by the article detecting section 32 (FIG. 11). For the article M2 that has failed to be initially detected, the information of the packet α is not sent to the first controlling section 20A (FIG. 11), and therefore, the information of the packet γ is not created; as a result, the second controlling section 20B (FIG. 11) does not recognize the presence of the article M2. As for the article M1 initially detected by the article detecting section 32, on the other hand, the second controlling section 20B recognizes the presence from the information of the packet γ.

In the above situation, the second controlling section 20B makes a decision as to whether or not to pick up the article M1 in accordance with the work division ratio set by the work content setting section 102B (FIG. 11). When it is decided to pick up the article M1, and the second mechanical section 14B picks up the article M1 from the conveyor 12 in accordance with an instruction from the work executing section 108A, the article M2 is exposed and its image is captured by the second camera 16B. Not recognizing that the second mechanical section 14B has picked up the article M1 from the conveyor 12, the article tracking section 34 in the image processing section 18 tries to continue to track the article M1. That is, the article tracking section 34 continues to iteratively obtain the shifted position information D2 until a predetermined time elapses from the moment that the robot 14 (the second mechanical section 14B) picked up the article M1. The article M2 whose external appearance is similar to that of the article M1 is detected by the article tracking section 34 in a manner similar to the detection of the article M1.

If the value of the detection parameter (coordinate values, rotation angle, dimensions, area size, etc.) for the article M2 on the conveyor 12 were exactly the same as that for the article M1, the article tracking section 34 would continue to track the article M2 as the article M1. On the other hand, when the value of the detection parameter (coordinate values, rotation angle, dimensions, area size, etc.) for the article M2 on the conveyor 12 is different from that for the article M1, as illustrated here, the article tracking section 34 tracks the article M2 as a newly detected article M. When the article tracking section 34 tracks the article M1 in the working space 22B, if the preparatory detection of the article M1 is first performed using the second (low resolution) detection algorithm (or the particle filter method), and then the complementary detection of the article M1 is performed using the first (high resolution) detection algorithm (or the normalized correlation method, generalized Hough transform method or blob detection method) by narrowing the range of the detection parameter (coordinate values, rotation angle, dimensions, area size, etc.), as earlier described, it may become difficult to subsequently detect the article M2 for which the detection parameter (coordinate values, rotation angle, dimensions, area size, etc.) is different from that for the first article M1. Therefore, if the article tracking section 34 has been unable to detect the article M1 in the complementary detection though it detected the presence of an article that looked like the article M1 in the preparatory detection, then it enlarges the range of the detection parameter (coordinate values, rotation angle, dimensions, area size, etc.) by a predetermined suitable amount and retries the complementary detection of the article M1 by using the first detection algorithm (or the normalized correlation method, generalized Hough transform method or blob detection method). In the example of FIG. 14, the articles M1 and M2 are located in approximately the same position, the only difference being their orientation; therefore, if the range of the rotation angle as the detection parameter, which has been narrowed to ±5 degrees, for example, is enlarged up to ±180 degrees, the article tracking section 34 can then detect the article M1 (actually, the article M2).

The article tracking section 34 that detected the article M2 as the article M1 considers that the orientation of the article M1 has changed while it is being tracked, and treats the article M1 whose orientation has changed (actually, the article M2) as a newly detected article M. The position information of the article M newly detected by the article tracking section 34 is processed in the same manner as the initial position information D1. The article tracking section 34 sets a new detection flag for the newly detected article M (the article M2), and transfers this new detection flag to the article managing section 112 together with such information as the position information (corresponding to the initial position information D1) of the detected article M, the camera ID of the second camera 16B used to capture the image of the article M, the image capture time of the article M, and the new article ID of the article M. Usually, the article managing section 112 that received the information from the article tracking section 34 transfers the information as the packet β to the first to third controlling sections 20A, 20B and 20C, as earlier described, but when the information received from the article tracking section 34 carries the new detection flag, the article managing section 112 transfers these pieces of information as the information of the packet α only to the information managing section 106A in the first controlling section 20A.

In the example of FIG. 14, since the article M2 has already passed the working space 22A of the first mechanical section 14A (FIG. 5) and entered the working space 22B of the second mechanical section 14B, the information managing section 106A creates the information of the packet γ based on the information of the packet α received from the article tracking section 34 via the article managing section 112, and immediately transfers the information of the packet γ to the information managing section 106B in the second controlling section 20B. The information managing section 106B which recognizes that the second mechanical section 14B picked up the article M1 from the conveyor 12 deletes the information of the packet δ concerning the article M1 and holds the information of the packet γ concerning the new article M (the article M2), and makes a decision as to whether or not to pick up the new article M (the article M2) in accordance with the work division ratio set by the work content setting section 102B.

Even when the position of the article M is displaced on the conveyor 12 after the article detecting section 32 (FIG. 11) has obtained the initial position information D1 of the article M, the article tracking section 34 can track the article M by performing substantially the same tracking process as the above tracking process performed when the articles overlap each other. For example, in the situation shown in FIG. 14, if the portion of the article M2 hidden behind the article M1 is small, the article detecting section 32 initially detects both the articles M1 and M2. The article tracking section 34 tracks both of the articles M1 and M2, and when the articles M1 and M2 enter the working space 22B of the second mechanical section 14B, the second controlling section 20B (FIG. 11) controls the second mechanical section 14B to pick up the hidden article M2 before the article M1, since the article M2 is located downstream from the article M1. When the article M2 is picked up first, the article M1 that lost the support is highly likely to be displaced in position on the conveyor 12.

When the article M1 is displaced in position on the conveyor 12, the article tracking section 34 performs the tracking process by regarding the article M1 as a new article. At this time, the approximate position of the article M1 after the positional displacement can be determined by performing the preparatory detection using the second algorithm (or the particle filter method). After the preparatory detection, the detection range is narrowed down to the range containing the approximate position thus determined and, by performing the complementary detection using the first detection algorithm (or the normalized correlation method or generalized Hough transform method), the accurate shifted position information D2 of the article M1 after the positional displacement can be obtained. If the amount of positional displacement of the article M1 on the conveyor 12 is so large that the article M1 cannot be detected by the complementary detection, the complementary detection should be retried by enlarging the range of the detection parameter (coordinate values, rotation angle, dimensions, etc.) by a predetermined suitable amount, as in the above tracking process performed when the articles overlap each other.

Next, referring to the flowcharts of FIGS. 15 to 22, the processing flows performed by the image processing section 18 and the robot controlling section 20 (the first to third controlling sections 20A, 20B and 20C) shown in FIG. 11 will be described in detail.

Figure 15:
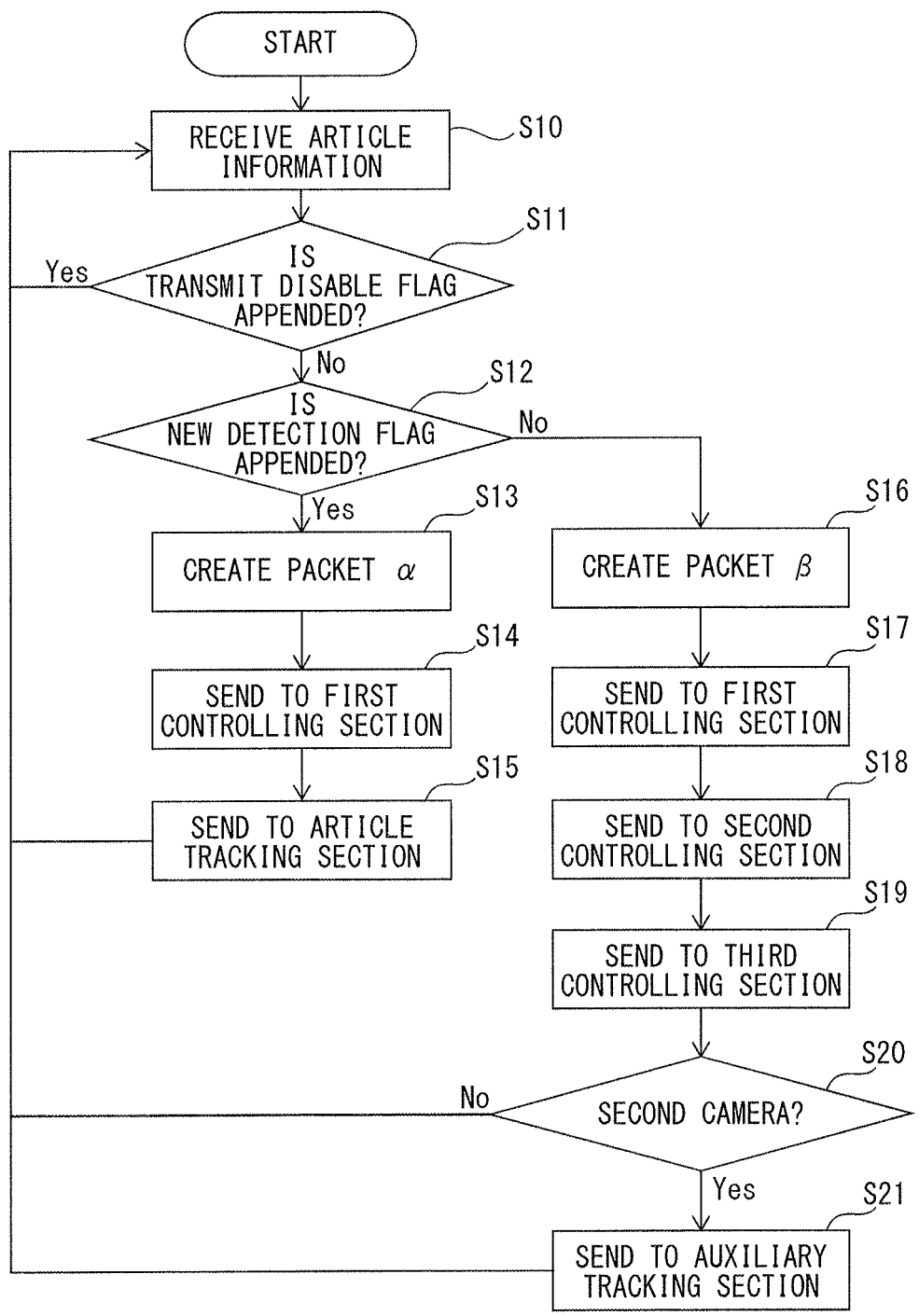
FIG. 15 is a flowchart illustrating the processing performed by an article managing section in the image processing section.

FIG. 15 illustrates the flow in which the article managing section 112 in the image processing section 18 receives article information from the article detecting section 32, the article tracking section 34, and the auxiliary tracking section 50, respectively, and transfers it as the information of the packet α or the information of the packet β to the information managing sections 106A, 106B and 106C in the first to third controlling sections 20A, 20B and 20C. First, in step S10, the article managing section 112 receives article information sent out from the article detecting section 32, the article tracking section 34, or the auxiliary tracking section 50. The article information is sent for each detected article M. In step S11, the article managing section 112 checks to see if the received article information is inappropriate information to be sent to the first to third controlling sections 20A, 20B and 20C (that, whether or not a transmit disable flag (to be described later) is appended to the article information). If such a transmit disable flag is appended, the process returns to step S10, and waits until the next article information is received. If such a transmit disable flag is not appended, the article managing section 112 proceeds to step S12 and checks to see if the detected article is a newly detected article (i.e., whether or not a new detection flag is appended to the article information). If the new detection flag is appended, the article managing section 112 creates a packet α in step S13, and sends the packet α to the first controlling section 20A. Since the initial position information D1 of the article M contained in the packet α is information necessary for the article tracking section 34 to start the tracking of the article M, the article managing section 112 in step S15 sends the information carried in the packet α (hereinafter referred to as a new article information) to the article tracking section 34.

If, in step S12, the new detection flag is not appended to the article information, the article managing section 112 creates a packet β in step S16, and sends the packet β to the information managing sections 106A, 106B and 106C in the first to third controlling sections 20A, 20B and 20C in steps S17, S18 and S19, respectively. Next, in step S20, the article managing section 112 checks to see if the article information received in step S10 is one that is generated by the second camera 16B. If the information is one that is not generated by the second camera 16B, the process returns to step S10, and waits until the next article information is received. If the information is one that is generated by the second camera 16B, the shifted position information D2 of the article M contained in the packet β may be information necessary for the auxiliary tracking section 50 to start the tracking of the article M, so that the article managing section 112 in step S21 sends the information carried in the packet β to the auxiliary tracking section 50. When the above process is completed, the process returns to step S10, and waits until the next article information is received.

Figure 16:
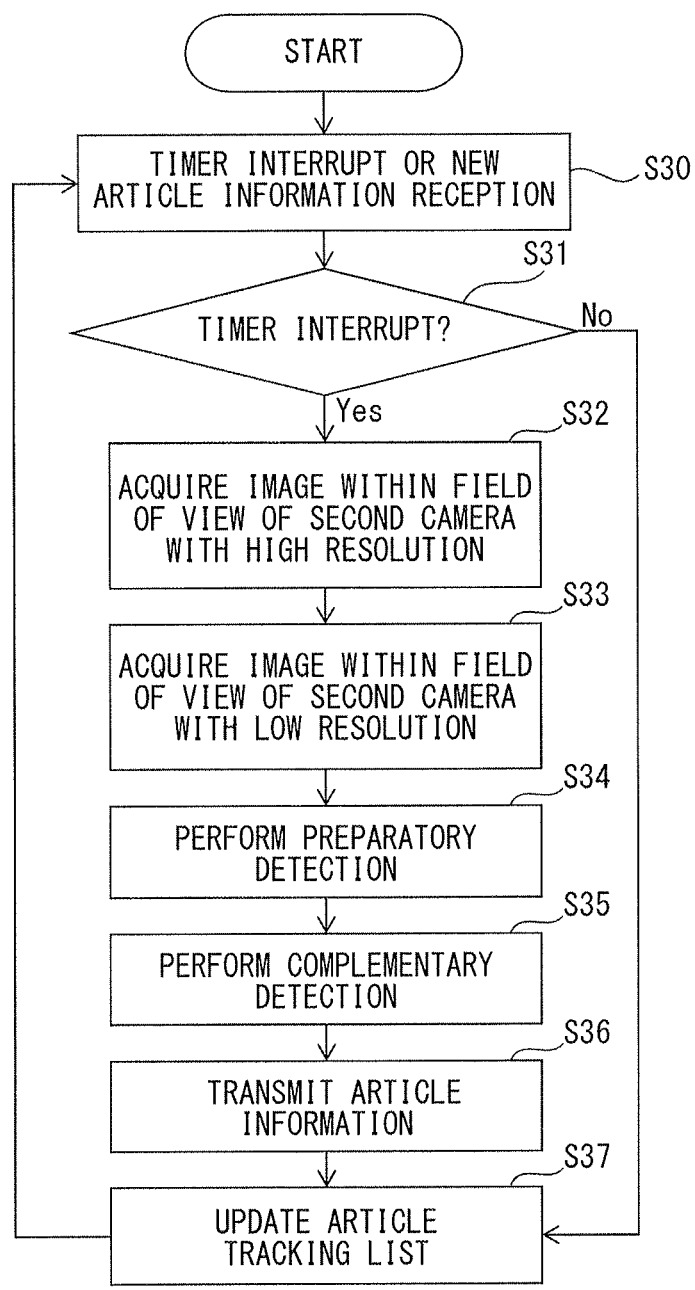
FIG. 16 is a flowchart illustrating the processing performed by an article tracking section in the image processing section.

FIG. 16 illustrates the flow of the tracking process performed by the article tracking section 34 in the image processing section 18. The article tracking section 34 repeatedly performs the tracking process of the article M as a timer is driven at intervals of time corresponding to the second period T, and appropriately processes new article information each time it is received from the article managing section 112. First, in step S30, the article tracking section 34 receives a timer interrupt signal occurring at predetermined intervals of time or receives new article information from the article managing section 112, and checks to see in step S31 if the interrupt signal is received or not. If the received one is not the interrupt signal (i.e., if new article information is received), the article tracking section 34 in step S37 records the new article to be tracked in a prestored article tracking list, thus updating the article tracking list, and then returns to step S30 to wait for the next reception. On the other hand, if the interrupt signal is received, the article tracking section 34 starts the tracking process for the current cycle. The article tracking section 34 obtains in step S32 two-dimensional image data generated by imaging the field of view 24 of the second camera 16B (FIG. 5) with the first resolution (or the high resolution), and obtains in step S33 two-dimensional image data generated by imaging the field of view 24 with the second resolution (or the low resolution).

The image data of the first resolution obtained in step S32 is used for the "complementary detection" (FIG. 18) in step S35, and the image data of the second resolution obtained in step S33 is used for the "preparatory detection" (FIG. 17) in step S34. Information concerning the article M detected in step S35 is sent to the article managing section 112 by the "article information transmission" process (FIG. 19) performed in step S36. After sending the information of the article M to the article managing section 112, the article tracking section 34 updates the capture time and moving image information D2 of the article M carried in the article tracking list so that the updated information can be used for the "preparatory detection" and "complementary detection" in the next cycle of the tracking process to be performed on the same article M; if there is any article M newly discovered in the "complementary detection", the newly discovered article M is added to the article tracking list. After updating the article tracking list, the process returns to step S30 and waits for the reception of the next interrupt signal or new article information.

Figure 17:
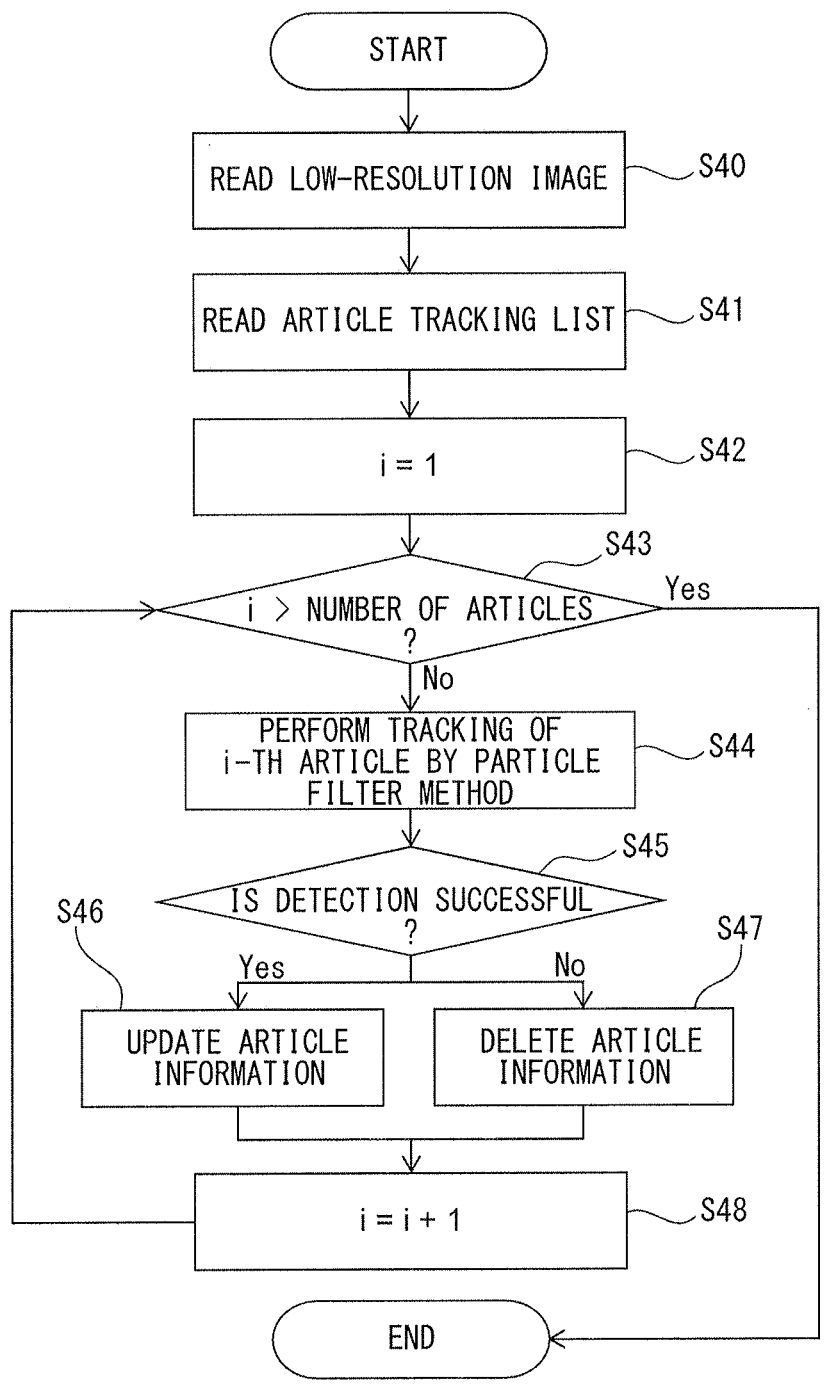
FIG. 17 is a flowchart illustrating the details of processing performed by the article tracking section.

FIG. 17 illustrates the detailed flow of the preparatory detection step S34 implemented in the flowchart of FIG. 16. The preparatory detection is performed using the image data of the second resolution (or the low resolution). In step S40, the article tracking section 34 reads the obtained image of the second resolution (or the low resolution). Next, in step S41, the article tracking section 34 reads the article tracking list that carries the information of the article M to be tracked in the current process. The tracking process is performed for each article M carried in the article tracking list thus read. In step S42, the article tracking section 34 initializes to 1 a counter variable "i" that indicates that the article M to be tracked in the current process is the "i-th" article in the article tracking list. In step S43, the counter variable i is compared with the number of articles carried in the article tracking list. If the counter variable i is larger than the number of articles, the preparatory detection is terminated by determining that the tracking of all the articles M carried in the article tracking list is completed. If the counter variable i is not larger than the number of articles, the article tracking section 34 proceeds to step S44 to perform the preparatory detection of the i-th article M in the article tracking list. In this process, the particle filter method is selected as the preparatory detection algorithm, but some other suitable detection algorithm may be selected.

Next, in step S45, the article tracking section 34 determines whether the approximate position information of the article M to be tracked has been obtained as the result of the preparatory detection (i.e., whether the preparatory detection has been successfully accomplished); if the preparatory detection has been successfully accomplished, the article tracking section 34 proceeds to step S46 and updates the information carried in the article tracking list, such as the position information, image capture time, etc. of the article M, with the information obtained in the current process. If the preparatory detection has not been successfully accomplished, this suggests that the article M to be tracked has physically vanished from the conveyor 12 because, for example, the first or second mechanical section 14A or 14B has picked up the article M; therefore, in step S47, the information of the article M is deleted from the article tracking list so that the article M will no longer be tracked. In the flowchart of FIG. 17, if the detection failed on the first try, the article information is deleted, but alternatively, if the detection failed, the preparatory detection may be retried, and if the preparatory detection has failed three times in succession, the article information may be deleted; in this way, the condition for deleting the article information may be changed as desired. During the period that the preparatory detection of the article M to be tracked is being retried, the conveying speed of the conveyor 12 can be calculated from the result of the tracking of another article and, using the thus calculated conveying speed and the time interval between the article image capture times in the previous and current preparatory detections, the current position and orientation of the article M to be tracked can be predicted, and the position information can be updated accordingly. When the updating or deletion of the article information is completed, the article tracking section 34 proceeds to step S48 to increment the counter variable i by 1, and then returns to step S43 to evaluate the value of the counter variable i.

Figure 18:
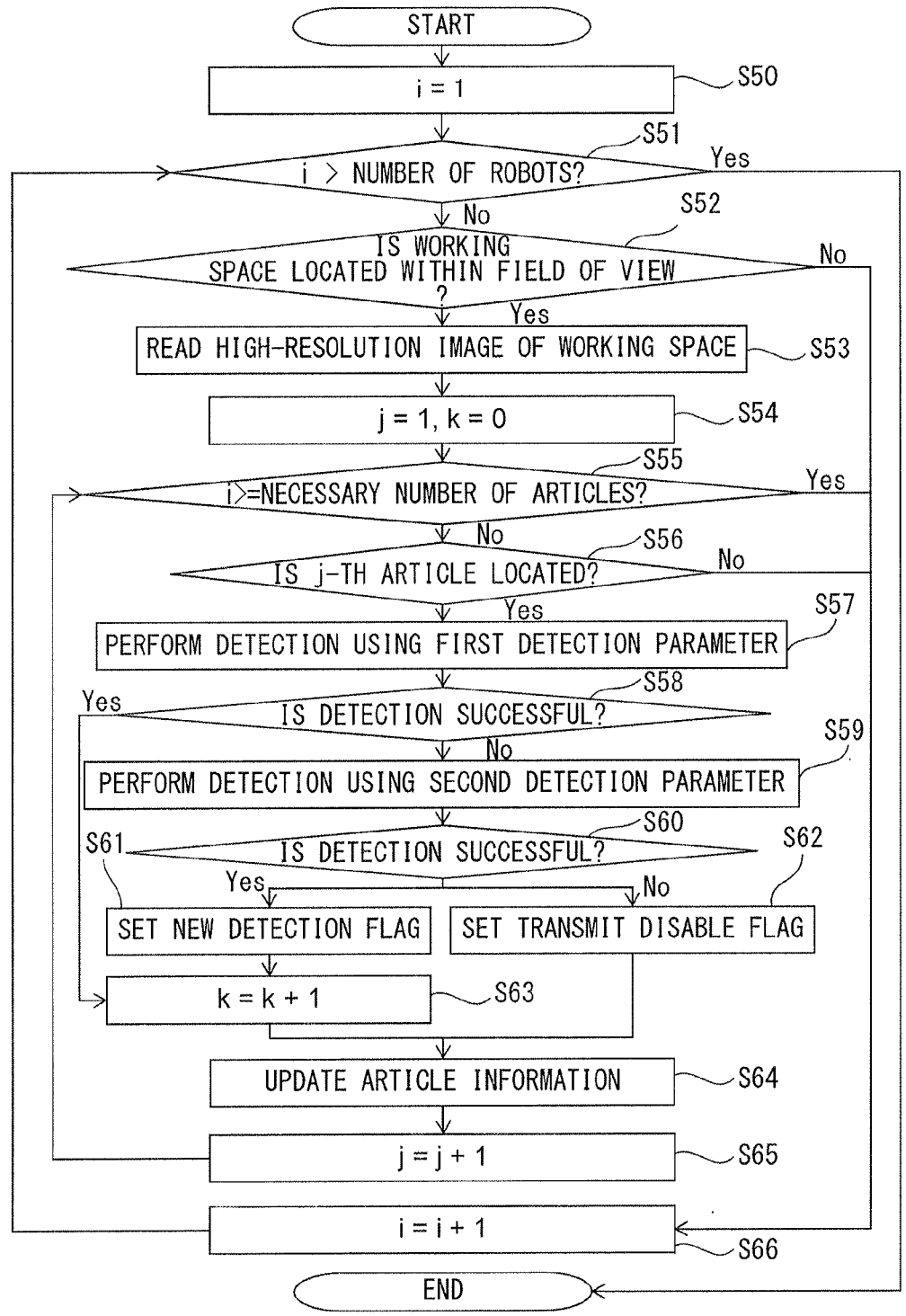
FIG. 18 is a flowchart illustrating the details of processing performed by the article tracking section.

FIG. 18 illustrates the detailed flow of the complementary detection step S35 implemented in the flowchart of FIG. 16. The complementary detection is performed using the image data of the first resolution (or the high resolution) generated by imaging the working spaces 22A, 22B and 22C of the first to third mechanical sections 14A, 14B and 14C, respectively. In step S50, the article tracking section 34 initializes to 1 the counter variable i that indicates that the corresponding one of the first to third mechanical sections 14A, 14B and 14C is the i-th mechanical section from the upstream side. Next, in step S51, the counter variable i is compared with the total number of the first to third mechanical sections 14A, 14B and 14C (in the present embodiment, three), and if the counter variable i is larger than the total number, the complementary detection in the current tracking process is terminated. If the counter variable i is not larger than the total number, the article tracking section 34 proceeds to step S52 to check to see if the working space of the i-th mechanical section is located within the field of view 24 of the second camera 16B. If the working space of the i-th mechanical section is located within the field of view 24, then the image data of the first resolution (or the high resolution) generated by imaging the working space of the i-th mechanical section is read in step S53. Checking to see if the working space is located within the field of view may be made by converting the coordinate values of the working space in the robot coordinate system into the coordinate values in the camera coordinate system or by the user prespecifying the working space as the tracking range. In the embodiment of FIG. 5, since the working space 22A of the first mechanical section 14A and the working space 22B of the second mechanical section 14B are located within the field of view 24, step S53 is carried out when i=1 or 2. If the working space of the i-th mechanical section is not located within the field of view 24, the process proceeds to step S66 to increment the counter variable i by 1, and then returns to step S51.

Next, in step S54, the article tracking section 34 initializes to 1 a counter variable "j" that indicates that the article M to be tracked in the current process is the "j-th" article from the downstream side in the conveying direction in the working space of the i-th mechanical section, and initializes to 0 a counter variable "k" that indicates the number of articles on which the complementary detection has been successfully done in the current tracking process. Since the complementary detection is performed to enable the mechanical section to physically hold and pick up the article M in its working space, the complementary detection need not be performed on all the articles located in the working space, but need only be performed so that the predetermined number of articles to be picked up by the mechanical section in a single operation as counted from the downstream side in the conveying direction (i.e., the necessary number of articles to be detected, which is determined by the actual application) can be detected. Therefore, in step S55, the article tracking section 34 compares the counter variable k with the necessary number of articles to be detected, and if it is larger than or equal to the necessary number, the complementary detection in the current working space is terminated, and the process proceeds to step S66. If the counter variable k is smaller than the necessary number, the article tracking section 34 proceeds to step S56 and checks to see if the j-th article M from the downstream side in the conveying direction, currently being tracked, is located in the working space of the i-th mechanical section.

If the j-th article M currently being tracked is not located in the working space of the i-th mechanical section, the complementary detection in that working space is terminated, and the process proceeds to step S66. If the j-th article M is located in the working space of the i-th mechanical section, then in step S57 the detection range is narrowed down based on the approximate position information of the article M obtained in the preparatory detection (FIG. 17) (e.g., the detection range is narrowed down to a range twice as large as the dimensions of the article M measured in the X-axis and Y-axis directions, respectively, in the two-dimensional image), while at the same time, the range of the detection parameter is set to a relatively narrow range (e.g., in the case of the rotation angle, to a range of about ±5 degrees of the previous detection result), and the complementary detection is performed using this first detection parameter. The normalized correlation method or the generalized Hough transform method can be used as the detection algorithm here.

In step S58, the article tracking section 34 checks to see if the complementary detection of the article M performed using the first detection parameter has been accomplished successfully or not. If the complementary detection has been accomplished successfully, the article tracking section 34 proceeds to step S63 to increment the counter variable k by 1 and then to step S64 to reflect the information of the article M obtained in the complementary detection into the article tracking list. If the complementary detection has not been accomplished successfully, it is highly likely that the condition of the article M has changed from that detected in the previous tracking process because, for example, the article M has been displaced in position on the conveyor 12 or because the article M hiding another article behind it has already been picked up by the mechanical section and the hidden article has been newly detected, as previously described with reference to FIG. 14. Therefore, in step S59, the article tracking section 34 performs the complementary detection of the article M by using a second detection parameter whose range is set wider than the range of the first detection parameter (e.g., in the case of the rotation angle, to a range of about ±180 degrees of the previous detection result).

In step S60, the article tracking section 34 checks to see if the complementary detection of the article M performed using the second detection parameter has been accomplished successfully or not. If the complementary detection has been accomplished successfully, the article tracking section 34 in step S61 sets the new detection flag in order to treat the article M as a new article that did not exist in the previous tracking process, and proceeds to step S63 to increment the counter variable k by 1 and then to step S64 to reflect the information of the article M obtained in the complementary detection into the article tracking list. Though the tracking process is continuing from the previous process, the information of the above article M is entered in the article tracking list as the information of a newly detected article; therefore, as previously described, the article managing section 112 treats this information as the information of the packet α, not the information of the packet β.

If the complementary detection has not been accomplished successfully, the situation may be such that, though the preparatory detection of the article M has been accomplished successfully, the article M is not in a condition to be picked up because, for example, the position or orientation of the article M has changed beyond the expected range from that in the initial detection or the previous complementary detection. Therefore, the article tracking section 34 sets a transmit disable flag in step S62, and updates the article information in step S64 by appending the transmit disable flag to the information of the article M carried in the article tracking list. After that, the article tracking section 34 increments the counter variable j by 1 in step S65, and then returns to step S55 to repeat the complementary detection.

Figure 19:
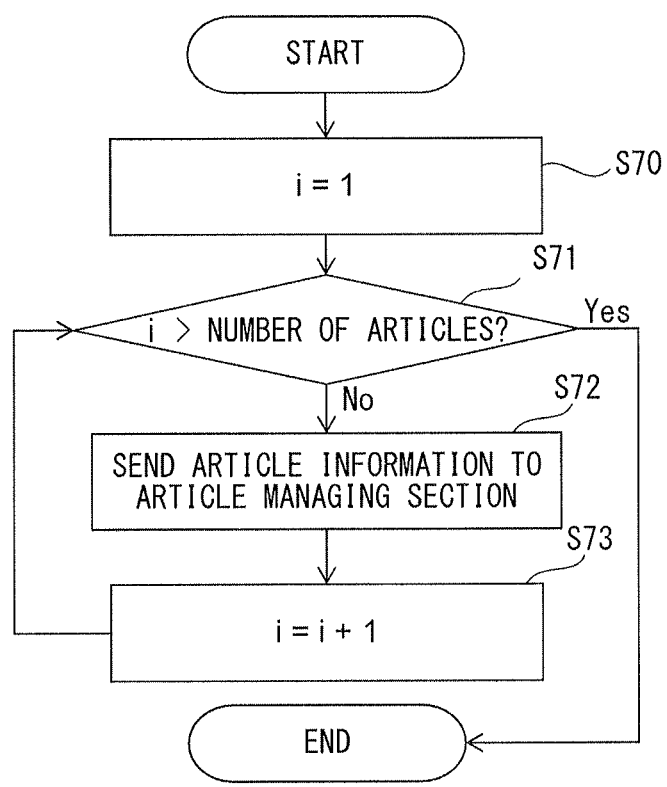
FIG. 19 is a flowchart illustrating the details of processing performed by the article tracking section.

FIG. 19 illustrates the detailed flow of the article information transmission step S36 implemented in the flowchart of FIG. 16. First, in step S70, the article tracking section 34 initializes to 1 the counter variable i that indicates the number of articles whose article information has been transmitted to the article managing section 112. Next, in step S71, the counter variable i is compared with the total number of articles whose information to be transmitted to the article managing section 112 has already been obtained as a result of the preparatory and complementation detection, and if the counter variable i is larger than the total number of articles, the article information transmission is terminated. If the counter variable i is not larger than the total number of articles, then in step S72 the article tracking section 34 transmits the article information to the article managing section 112. After that, the article tracking section 34 increments the counter variable i by 1 in step S73, and then returns to step S71.

Figure 20:
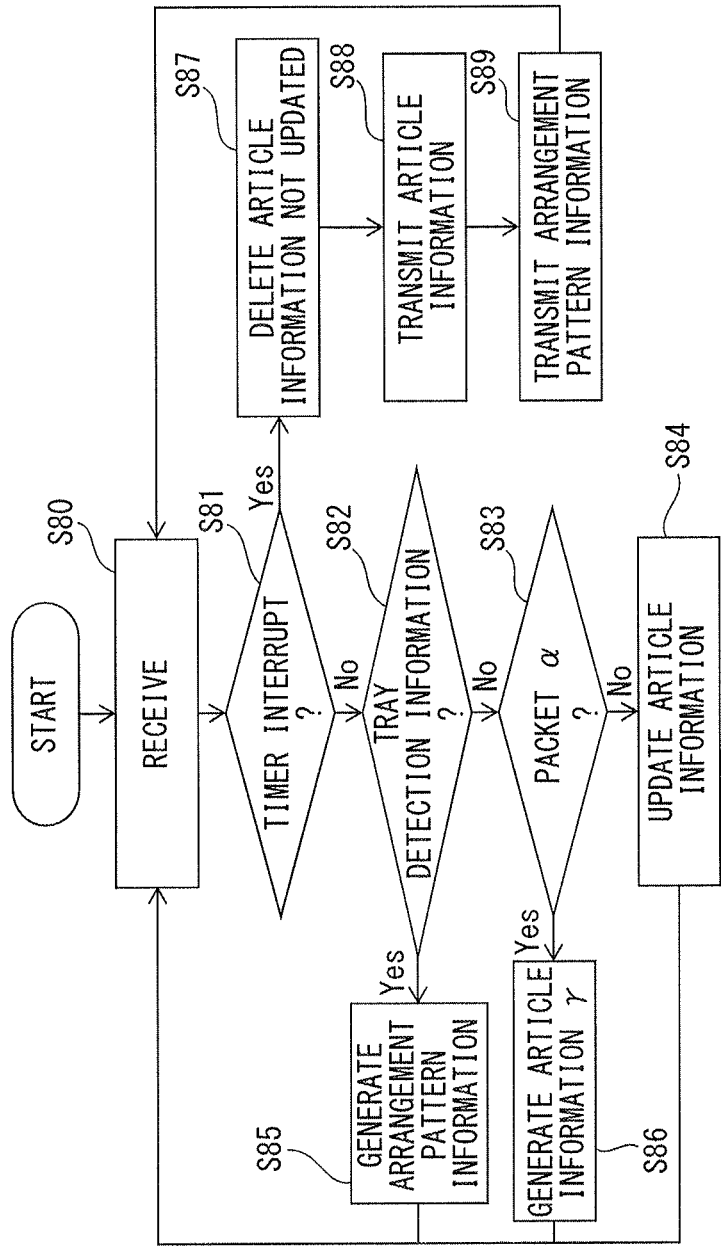
FIG. 20 is a flowchart illustrating the processing performed by an information managing section in a first controlling section.

FIG. 20 illustrates the processing flow performed by the information managing section 106A (FIG. 11) in the first controlling section 20A. The information managing section 106A performs the processing for updating the article information or the information concerning the arrangement pattern 58 on the tray 54 (FIG. 6A) in response to the timer driving, the processing of the tray detection information received from the tray detecting section 104, and the processing of the article information received from the article managing section 112. First, in step S80, the information managing section 106A receives a timer interrupt signal occurring at predetermined intervals of time or receives the article information (packet α or packet β) from the article managing section 112 or the tray detection information from the tray detecting section 104, and checks to see in step S81 if the interrupt signal is received or not. If the interrupt signal is received, the information managing section 106A performs the following processing which is to be performed at predetermined intervals of time. That is, in step S87, the information of any article for which an information update by the packet β has not been received from the article managing section 112 for a predetermined period of time. Then, in step S88, the article information is transmitted as needed to the work executing section 108A or to the information managing section 106B in the second controlling section 20B, based on the current position of the article (refer to FIG. 21 for details). Further, in step S89, the arrangement pattern information (to be described later) is transmitted as needed to the work executing section 108A or to the information managing section 106B in the second controlling section 20B, based on the current position information of each pattern element in the arrangement pattern 58 on the tray 54 (refer to FIG. 22 for details). After performing the above processing, the information managing section 106A returns to step S80 and waits for the next reception.

If the received one is not the interrupt signal, the information managing section 106A proceeds to step S82 and checks to see if the received one is the tray detection information or not. If the received one is the tray detection information, the information managing section 106A proceeds to step S85 and generates the arrangement pattern information, including the position information of each pattern element, from the information of the arrangement form 59 (FIG. 6B) that defines the arrangement pattern 58. The arrangement pattern information also includes the detection value of the encoder 52 read at the instant of detection of the tray 54, and the position information of each pattern element can be updated whenever necessary by reading the current detection value of the encoder 52.

If the received one is not the tray detection information, this means that the article information is received from the article managing section 112, and the information managing section 106A proceeds to step S83 and checks to see if the received article information is the information of the packet α or not. If it is the information of the packet α, this means that the received information is the new article information, and the information managing section 106A proceeds to step S86 and generates the information of the packet γ to be managed among the first to third controlling sections 20A, 20B and 20C. If it is not the information of the packet α, this means that the received article information is the information of the packet β (i.e., the information for updating the existing article information), and the information managing section 106A proceeds to step S84 and updates the information of the packet γ managed in the first controlling section 20A by the packet β.

Figure 21:
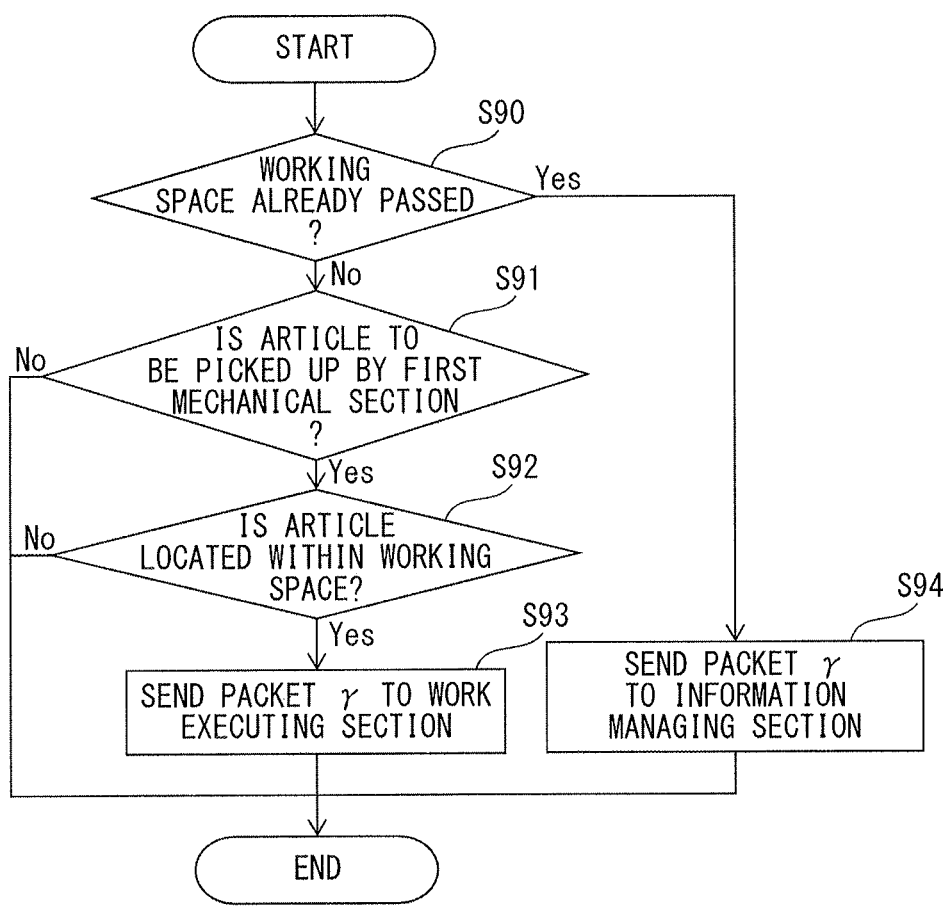
FIG. 21 is a flowchart illustrating the details of processing performed by the information managing section.

FIG. 21 illustrates the detailed flow of the article information transmission step S88 implemented in the flowchart of FIG. 20. In step S90, the information managing section 106A checks to see if the article M has already passed the working space 22A of the first mechanical section 14A. If the article M has already passed the working space 22A, the information managing section 106A proceeds to step S94 and sends the information of the packet γ of the article M to the information managing section 106B in the second controlling section 20B so that the second or third mechanical section 14B or 14C on the downstream side can perform the work, and after that, the article information transmission is terminated. If the article M has not yet passed the working space 22A, the information managing section 106A proceeds to step S91 and checks to see if the article M is the article to be transferred by the first mechanical section 14A in accordance with the prespecified work division ratio.

For example, when the work division ratio among the first to third mechanical sections 14A, 14C and 14B is set to 1:1:1, the first mechanical section 14A repeatedly perform the work to pick up one article while letting two other articles pass by. When the hand of the first mechanical section 14A is configured to be able to hold two articles together, the first mechanical section 14A can perform the work to pick up two article together while letting four other articles pass by. If it is determined that the article M is not the article to be transferred by the first mechanical section 14A by considering the work division ratio to be shared by the first mechanical section 14A at that time, the article information transmission is terminated. If it is determined that the article M is the article to be transferred by the first mechanical section 14A, the information managing section 106A proceeds to step S92 and checks to see if the article M is located within the working space 22A of the first mechanical section 14A. If it is located within the working space 22A, the information of the packet γ of the article M is sent to the work executing section 108A in step S93, after which the article information transmission is terminated.

FIG. 22 illustrates the detailed flow of the arrangement pattern information transmission step S89 implemented in the flowchart of FIG. 20. In step S100, the information managing section 106A updates the position information of each pattern element by using the current value of the encoder 56. Next, in step S101, it is checked to see if the pattern element has already passed the working space 22A of the first mechanical section 14A. If the pattern element has already passed the working space 22A, the information managing section 106A proceeds to step S105 and sends the arrangement pattern information to the information managing section 106B in the second controlling section 20B so that the second or third mechanical section 14B or 14C on the downstream side can perform the work, and after that, the arrangement pattern information transmission is terminated. If the pattern element has not yet passed the working space 22A, the information managing section 106A proceeds to step S102 and checks to see if the pattern element is the pattern element on which the article is to be placed by the first mechanical section 14A in accordance with the prespecified work division ratio. If it is determined that the pattern element is not the pattern element on which the article is to be placed by the first mechanical section 14A by considering the work division ratio to be shared by the first mechanical section 14A at that time, the arrangement pattern information transmission is terminated.

If it is determined to be the pattern element on which the article is to be placed by the first mechanical section 14A, the information managing section 106A proceeds to step S103 and checks to see if the pattern element is located within the working space 22A of the first mechanical section 14A. If it is located within the working space 22A, the arrangement pattern information is sent to the work executing section 108A in step S104, after which the arrangement pattern information transmission is terminated. Based on the information of the packet γ and the arrangement pattern information received from the information managing section 106A, the work executing section 108A executes the article transfer work for picking up the article M from the conveyor 12 and placing it onto the tray 54 on the discharge conveyor 42 in accordance with the predetermined arrangement pattern.

FIGS. 20 to 22 have each illustrated the processing flow performed by the information managing section 106A in the first controlling section 20A, but it will be recognized that the information managing section 106B in the second controlling section 20B and the information managing section 106C in the third controlling section 20C can perform substantially the same processing as that performed by the information managing section 106A, except that neither the processing of the tray detection information nor the processing of the packet α is performed.

While the invention has been described with reference to specific embodiments, it will be understood, by those skilled in the art, that various changes or modifications may be made thereto without departing from the scope of the following claims.

The invention claimed is:

1. An article transferring device, comprising:
a conveyor configured to convey an article;
a robot configured to hold and transfer the article;
an image capturing section configured to capture an image of the article;
an image processing section configured to control the image capturing section and detect the article based on data of the image captured by the image capturing section; and
a robot controlling section configured to control the robot with use of information of the article detected by the image processing section;
wherein the image processing section comprises:
an article detecting section configured to execute image capturing and detection of a plurality of articles that move according to a conveying motion of the conveyor, with a first period allowing all of the plurality of articles to be captured and detected, and obtain initial position information of each of the all of the articles; and
an article tracking section configured to execute image capturing and detection of the plurality of articles that move according to the conveying motion of the conveyor, with a second period shorter than the first period, and obtain shifted position information of each of the plurality of articles iteratively with the second period, the shifted position information being based on the initial position information; and
wherein the robot controlling section is configured to control the robot with use of the shifted position information, so as to make the robot hold and transfer each of the plurality of articles while following the conveying motion of the conveyor.

2. The article transferring device of claim 1, wherein the article tracking section is configured to obtain first-resolution image data captured by imaging an inside of a working space of the robot and second-resolution image data captured by imaging an outside of the working space, a second resolution of the second-resolution image data being lower than a first resolution of the first-resolution image data; and
wherein the article tracking section is configured to detect an article located inside the working space with use of the first-resolution image data and an article located outside the working space with use of the second-resolution image data.

3. The article transferring device of claim 2, wherein the image capturing section includes a switching mechanism configured to switch a resolution between the first resolution and the second resolution.

4. The article transferring device of claim 1, wherein the article tracking section is configured to select either a first detection algorithm that ensures a first processing speed and a first accuracy or a second detection algorithm that ensures a second processing speed or a second accuracy, the second processing speed being higher than the first processing speed, the second accuracy being lower than the first accuracy, and to use a selected detection algorithm; and
wherein the article tracking section is configured to detect an article located inside a working space of the robot with use of the first detection algorithm and an article located outside the working space with use of the second detection algorithm.

5. The article transferring device of claim 1, wherein the article tracking section is configured to continue to iteratively obtain the shifted position information, until a predetermined time lapses after the robot has held the article.

6. The article transferring device of claim 1, wherein the image capturing section includes a single camera; and
wherein the article detecting section and the article tracking section are configured to make the camera capture the image of the article and detect the article based on the data of the image captured by the camera.

7. The article transferring device of claim 1, wherein the image capturing section includes a first camera and a second camera, configured to operate independently of each other;

wherein the article detecting section is configured to make the first camera capture the image of the article and detect the article based on the data of the image captured by the first camera; and wherein the article tracking section is configured to make the second camera capture the image of the article and detect the article based on the data of the image captured by the second camera.

8. The article transferring device of claim 7, wherein the image capturing section includes a third camera configured to operate independently of the first and second cameras;

wherein the image processing section further comprises an auxiliary tracking section configured to control the third camera and execute image capturing and detection of a plurality of articles that move according to the conveying motion of the conveyor, with a third period shorter than the first period;

wherein the auxiliary tracking section is configured to obtain additional shifted position information of each of the plurality of articles iteratively with the third period, the additional shifted position information being based on the shifted position information obtained by the article tracking section; and wherein the robot controlling section is configured to control the robot with use of the additional shifted position information, so as to make the robot hold and transfer each of the plurality of articles while following the conveying motion of the conveyor.

9. The article transferring device of claim 1, wherein the robot includes a first mechanical section and a second mechanical section, configured to operate independently of each other; and wherein the robot controlling section includes a first controlling section configured to control the first mechanical section and a second controlling section configured to control the second mechanical section, the first and second controlling section being configured to make the first and second mechanical sections hold articles, respective numbers of which are defined in accordance with a predetermined ratio of operation.

10. An article transferring method, configured to make a robot hold and transfer a plurality of articles conveyed by a conveyor, the method comprising:

executing image capturing and detection of the plurality of articles that move according to a conveying motion of the conveyor, with a first period allowing all of the plurality of articles to be captured and detected, and obtaining initial position information of each of said all of the articles;

executing image capturing and detection of the plurality of articles that move according to the conveying motion of the conveyor, with a second period shorter than the first period, and obtaining shifted position information of each of the plurality of articles iteratively with the second period, the shifted position information being based on the initial position information; and controlling the robot with use of the shifted position information, so as to make the robot hold and transfer each of the plurality of articles while following the conveying motion of the conveyor.

11. The article transferring method of claim 10, wherein obtaining the shifted position information includes continuing to iteratively obtain the shifted position information, until a predetermined time lapses after the robot has held the article.

12. The article transferring method of claim 10, further comprising executing image capturing and detection of the plurality of articles that move according to the conveying motion of the conveyor, with a third period shorter than the first period, and obtaining additional shifted position information of each of the plurality of articles iteratively with the third period, the additional shifted position information being based on the shifted position information obtained previously; and controlling the robot with use of the additional shifted position information, so as to make the robot hold and transfer each of the plurality of articles while following the conveying motion of the conveyor.

* * * * *